US012724792B1

(12) United States Patent
Mukherjee et al.

(10) Patent No.: US 12,724,792 B1
(45) Date of Patent: Sep. 1, 2026

(54) MICROSERVICES BASED OBJECT-ORIENTED CLOUD SERVICES AND SYSTEMS FOR LIMITING DATA FOOTPRINTS AND DATA VULNERABILITY

(71) Applicant: Bank of America Corporation, Charlotte, NC (US)

(72) Inventors: Maharaj Mukherjee, Poughkeepsie, NY (US); Carl M. Benda, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 19/090,765

(22) Filed: Mar. 26, 2025

(51) Int. Cl.
*G06F 16/27* (2019.01)
*G06F 16/215* (2019.01)
*G06F 16/22* (2019.01)
*H04L 9/40* (2022.01)

(52) U.S. Cl.
CPC ............ *G06F 16/27* (2019.01); *G06F 16/215* (2019.01); *G06F 16/2282* (2019.01); *H04L 63/10* (2013.01)

(58) Field of Classification Search
CPC .... G06F 16/27; G06F 16/215; G06F 16/2282; H04L 63/10
See application file for complete search history.

(56) References Cited

U.S. PATENT DOCUMENTS

| | | | | |
|---|---|---|---|---|
| 8,638,674 | B2 | 1/2014 | Nugent | |
| 9,137,106 | B2 | 9/2015 | McCarthy et al. | |
| 9,218,000 | B2 | 12/2015 | McLaughlin et al. | |
| 9,300,552 | B2 | 3/2016 | Dube et al. | |
| 9,886,347 | B2 * | 2/2018 | Hrle | G06F 16/275 |
| 10,402,090 | B1 | 9/2019 | Tsaur et al. | |
| 11,003,434 | B2 | 5/2021 | Duvur et al. | |
| 11,290,446 | B2 | 3/2022 | Maidl et al. | |
| 12,299,162 | B1 * | 5/2025 | Butler | H04L 9/3213 |
| 2021/0216612 | A1 * | 7/2021 | Wojcik | H04L 9/3247 |
| 2026/0050682 | A1 * | 2/2026 | Butler | G06F 21/6218 |

* cited by examiner

*Primary Examiner* — Tyler J Torgrimson
(74) *Attorney, Agent, or Firm* — Banner & Witcoff, Ltd.

(57) ABSTRACT

A system and method manage data replication in a cloud computing environment using a microservices-based, object-oriented architecture to limit data footprints and enhance security across multiple cloud vendors. A processor encapsulates content into a data unit with locations and access privileges, stored in memory. A footprint table tracks copies, enforcing a predefined maximum via deletion algorithms (e.g., LIFO, FIFO, LRU). The system handles requests to create, access, move, or temporarily store encrypted copies, updating locations and privileges dynamically. Unique features include real-time auditing, temporary copy management with metadata tagging, data virtualization integration, and adaptive replication limits based on system load. This reduces vulnerability by controlling replication, ensuring privilege enforcement, and providing detailed logs, addressing cloud-specific challenges like data sprawl and multi-vendor inconsistency.

20 Claims, 8 Drawing Sheets

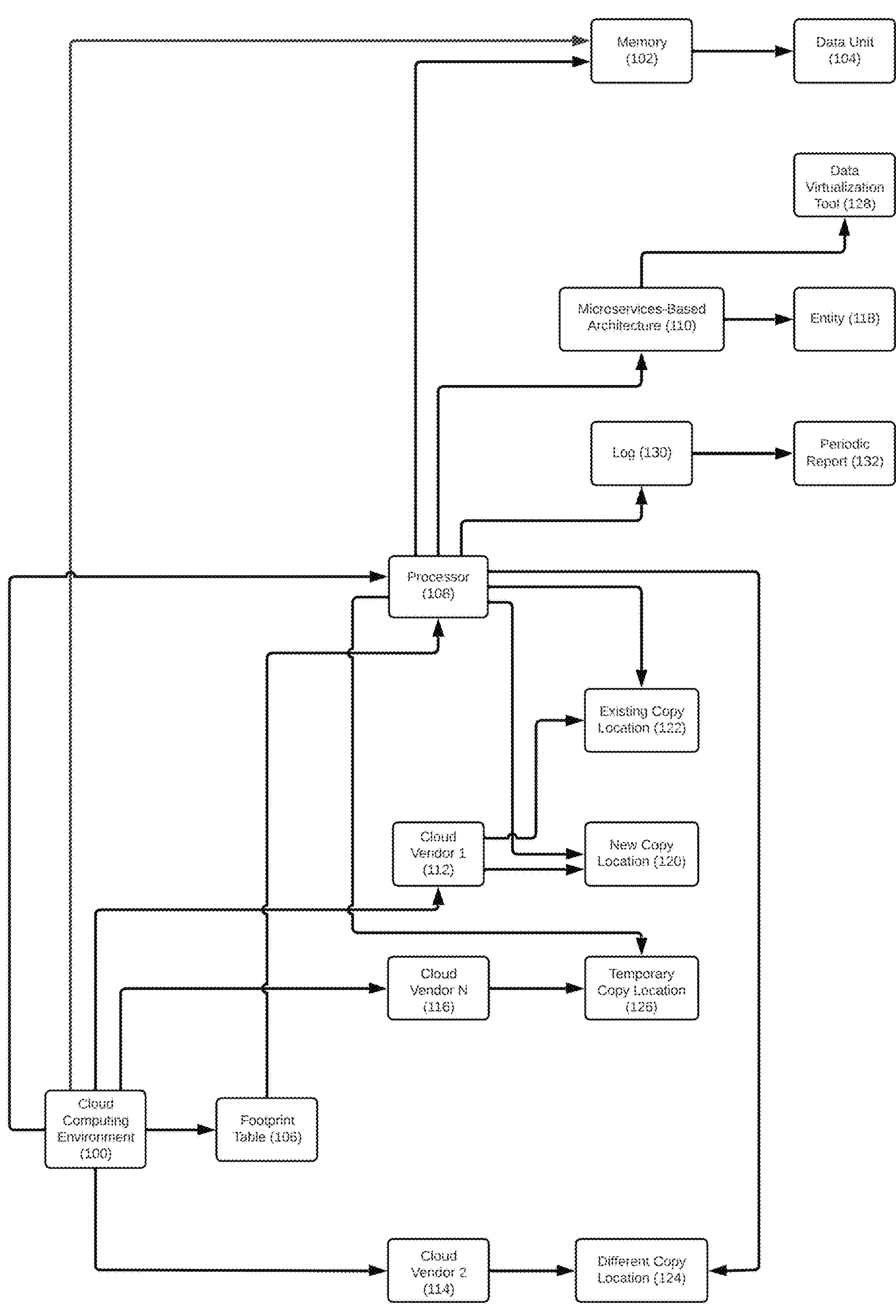
FIG. 1: Sample System Architecture Diagram

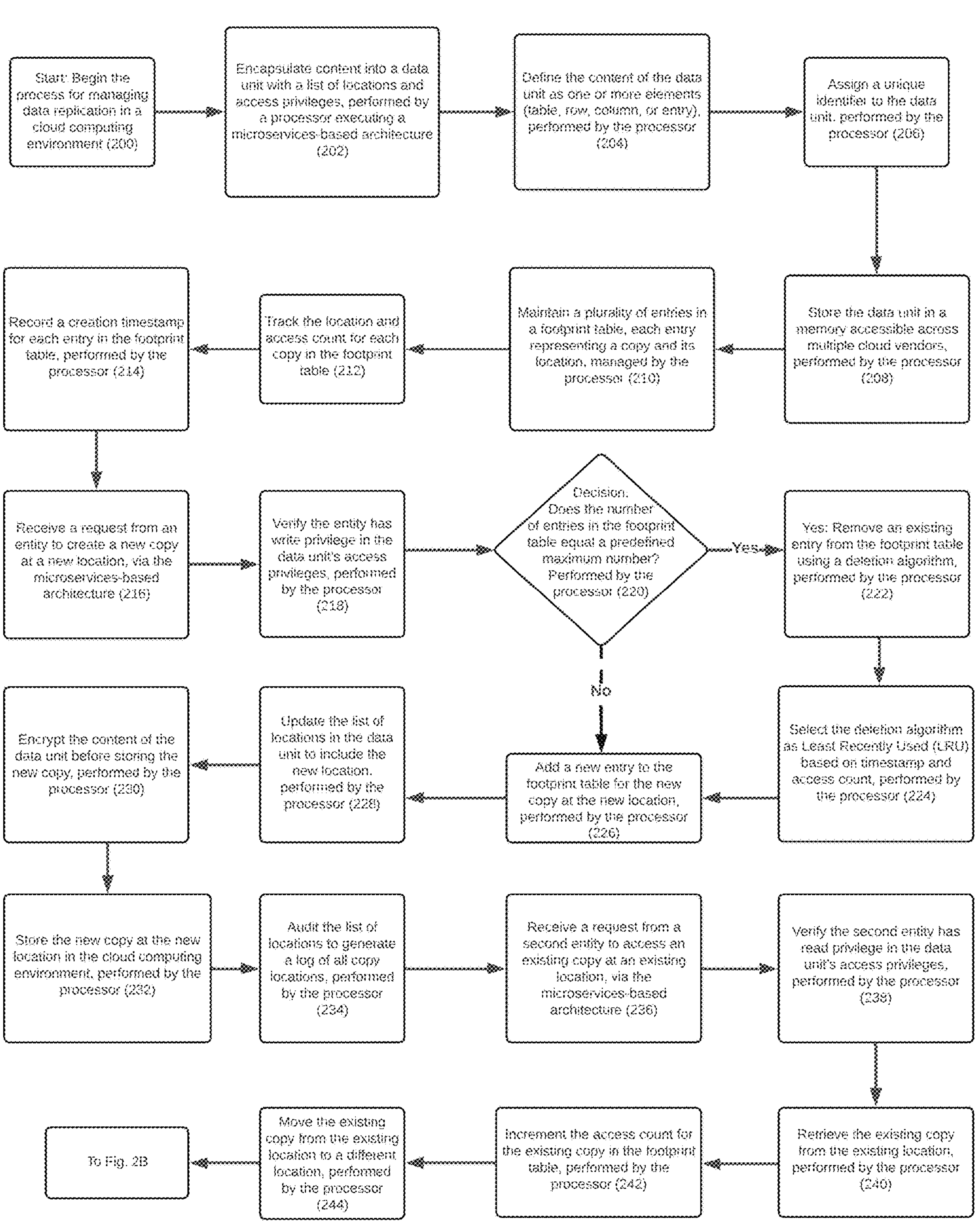
FIG. 2A: Sample Flow Diagram

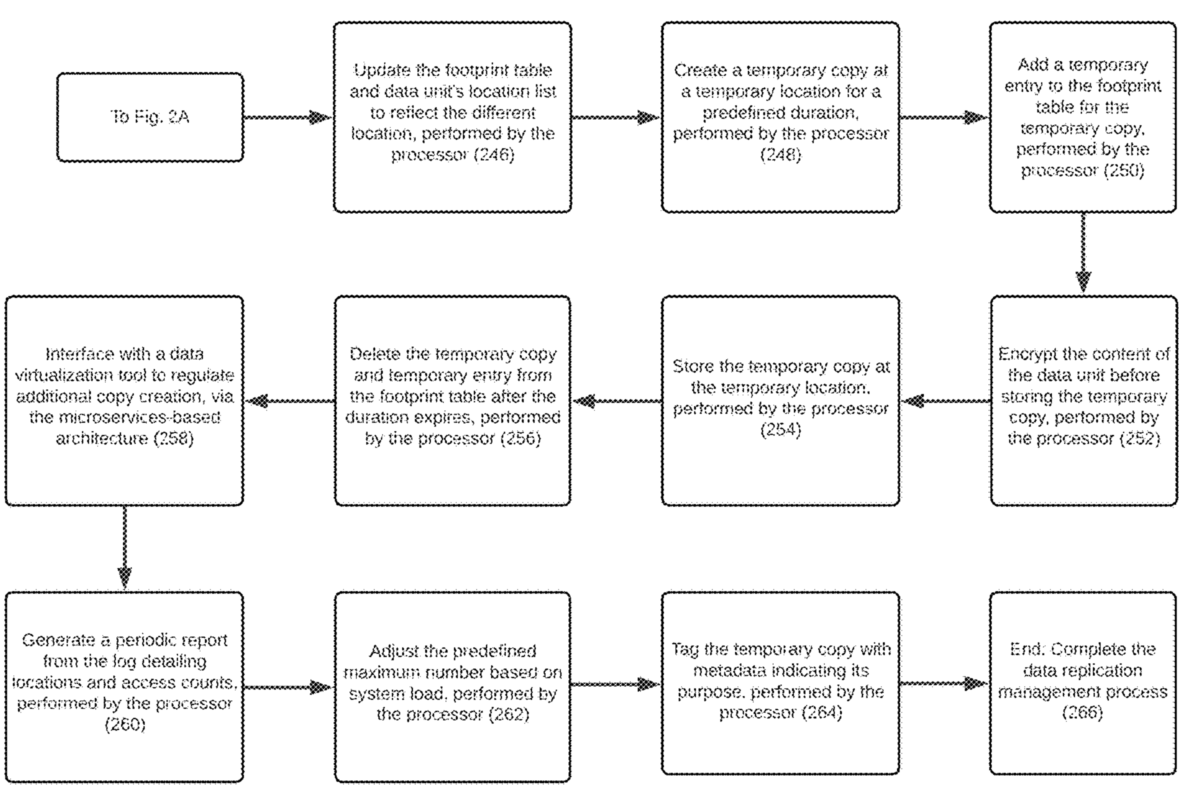
FIG. 2B: Sample Flow Diagram

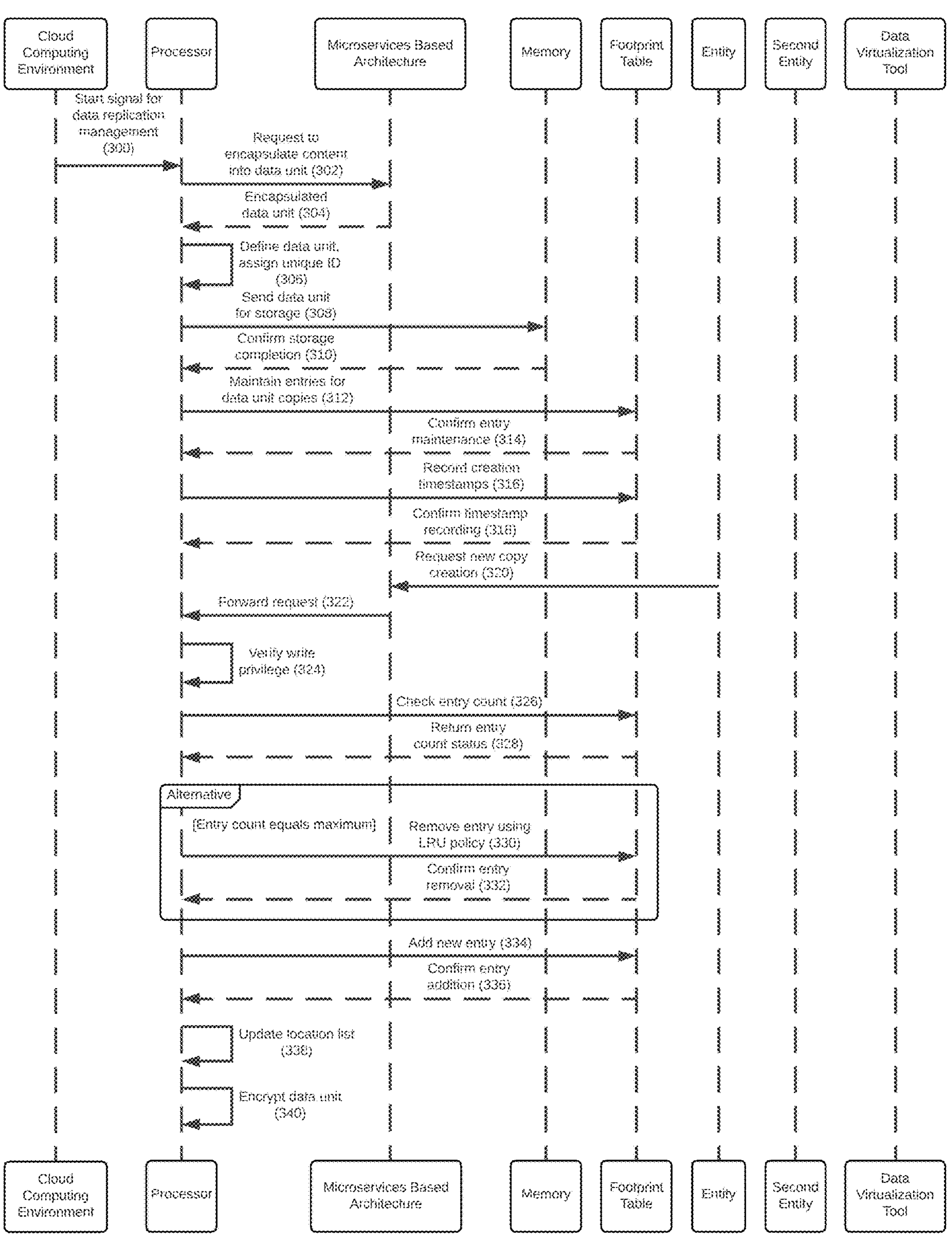
FIG. 3A: Sample Sequence Diagram

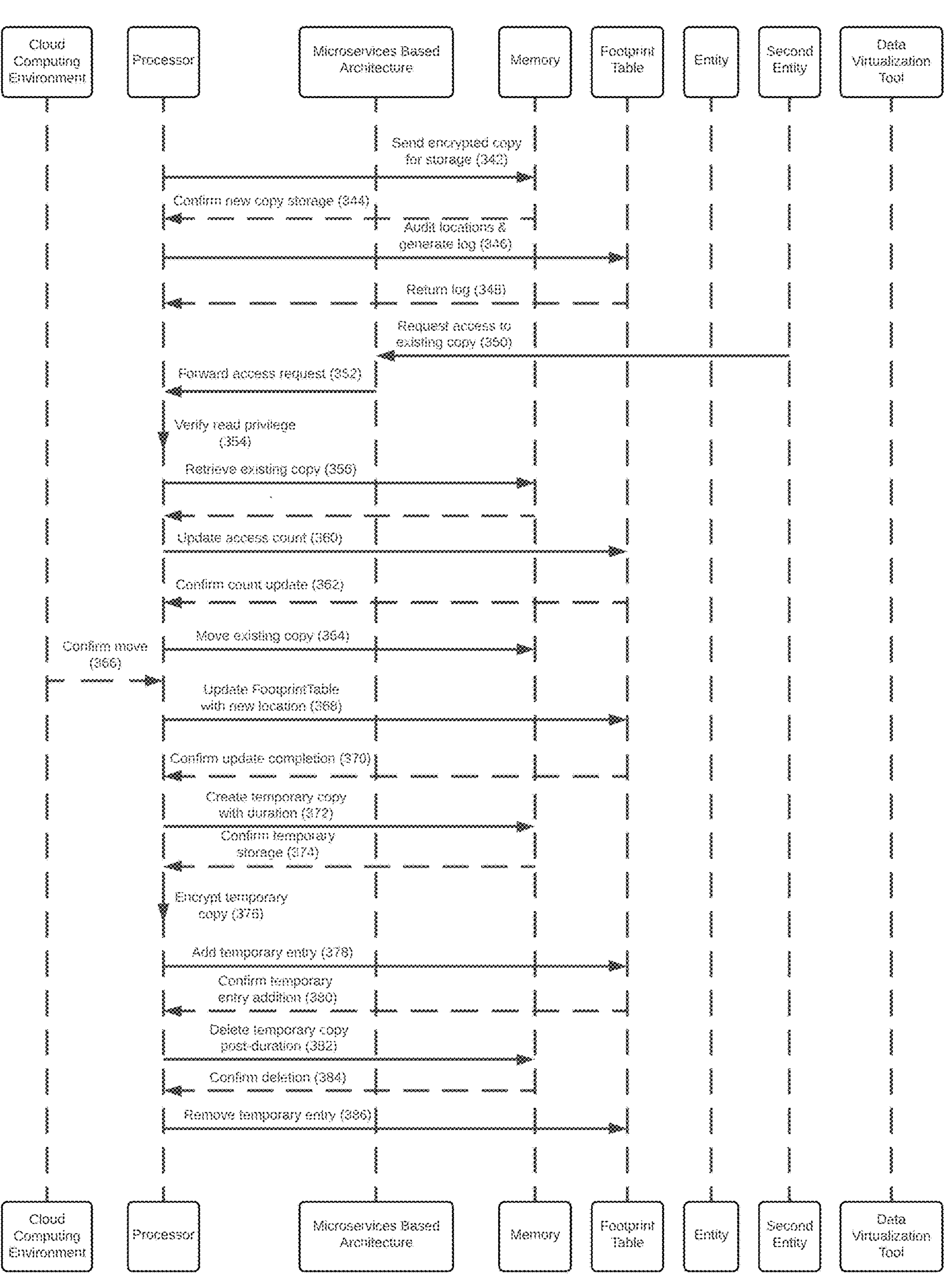
FIG. 3B: Sample Sequence Diagram

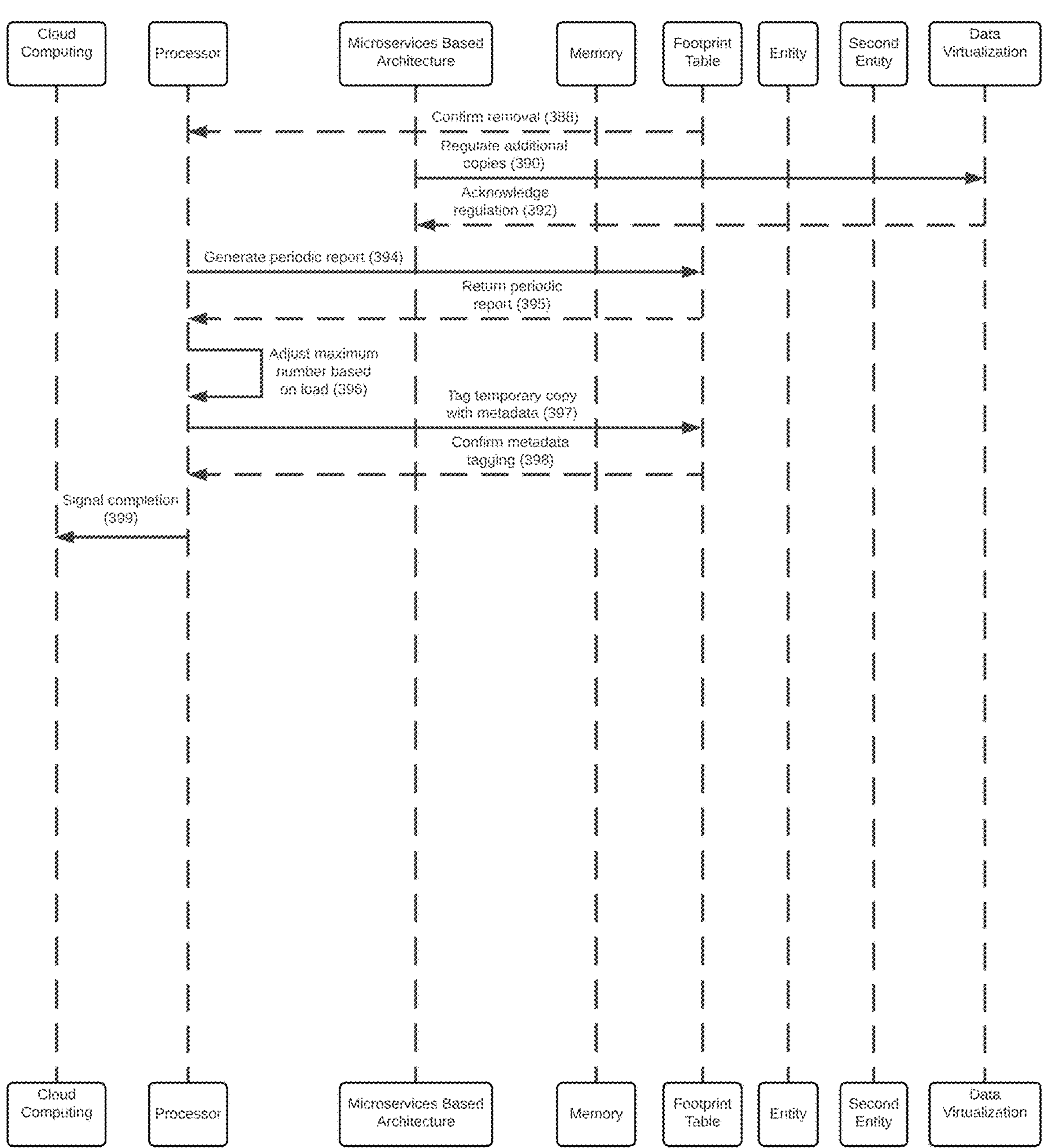
FIG. 3C: Sample Sequence Diagram

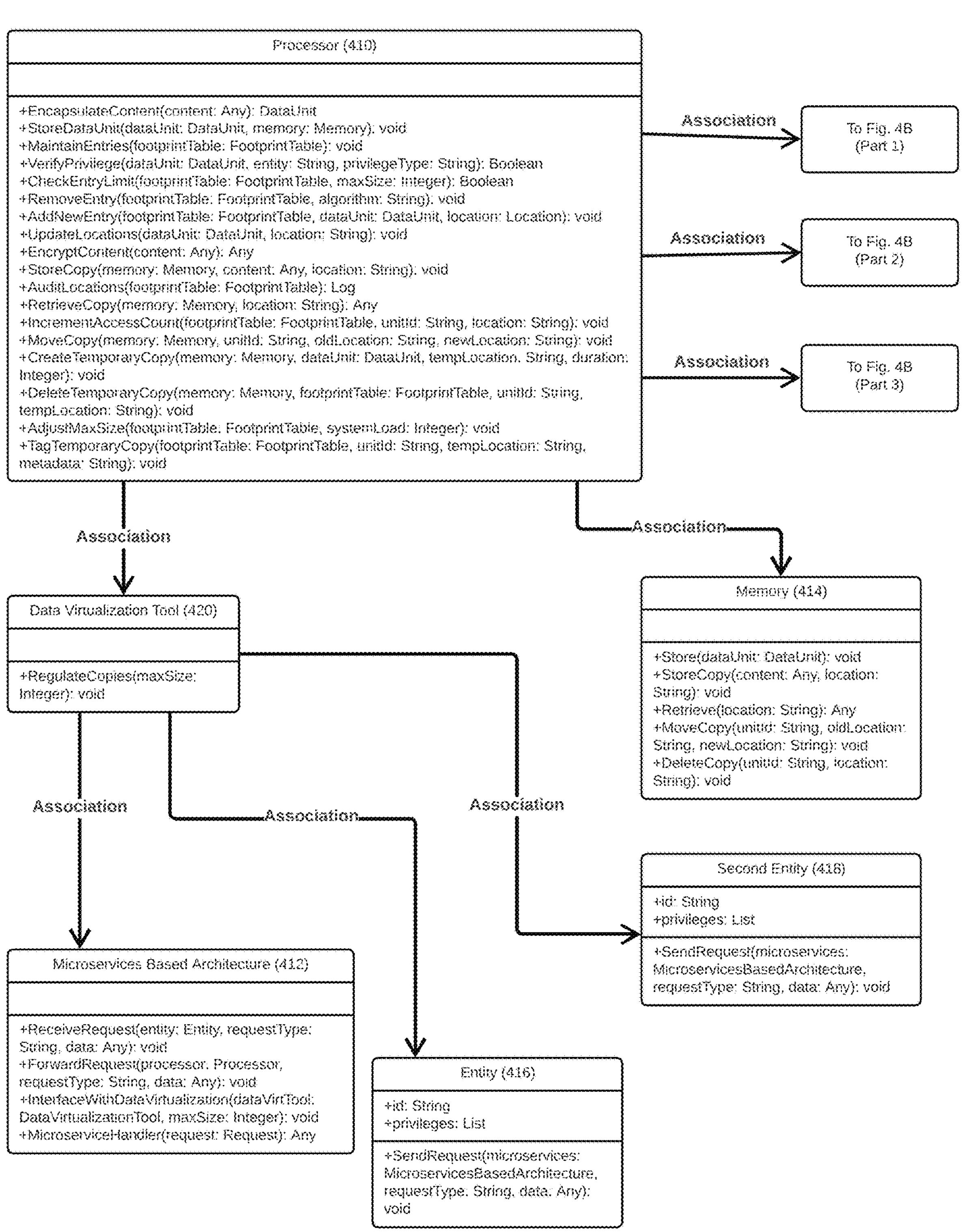
FIG. 4A: Sample Class Diagram

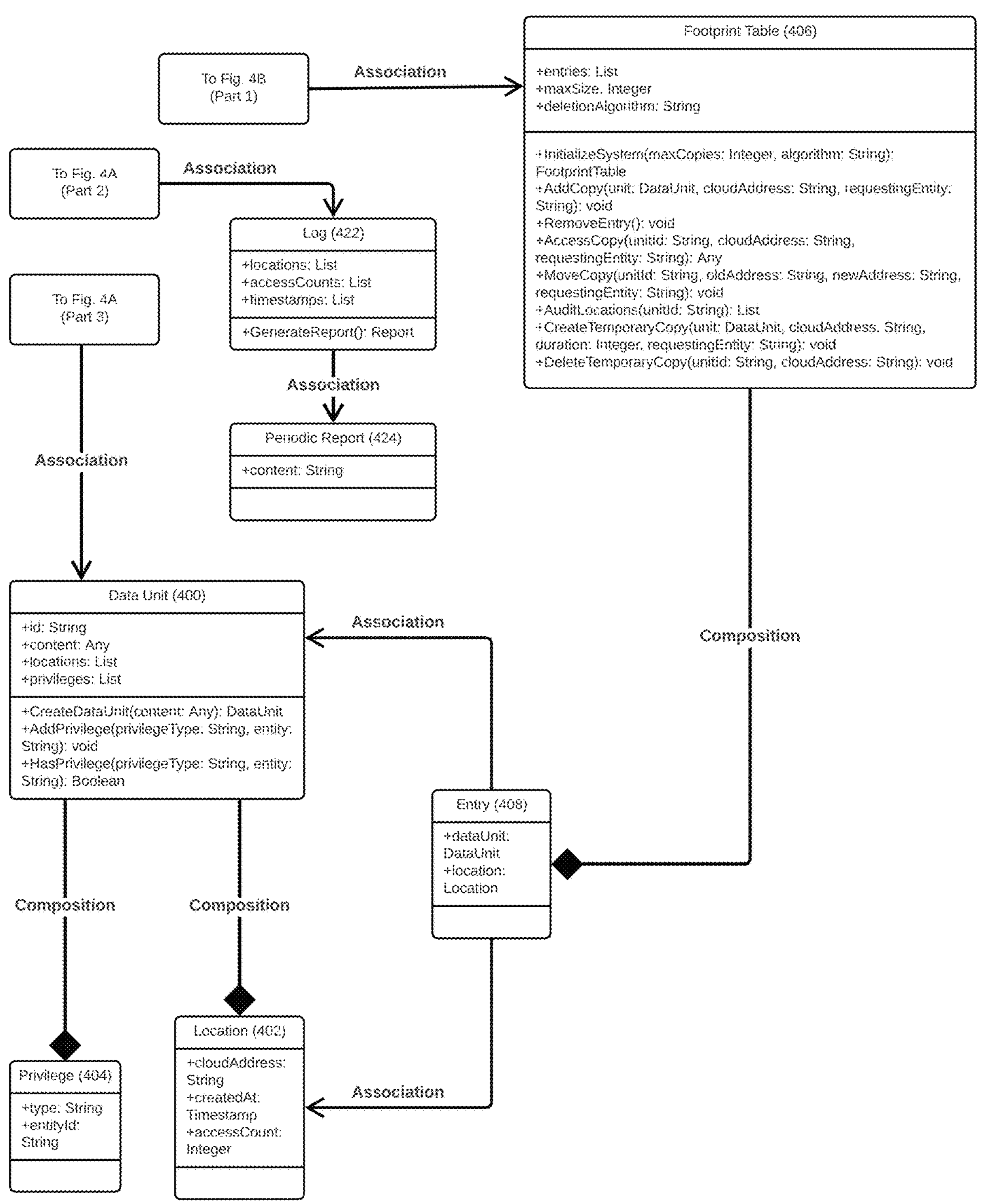
FIG. 4B: Sample Class Diagram

MICROSERVICES BASED OBJECT-ORIENTED CLOUD SERVICES AND SYSTEMS FOR LIMITING DATA FOOTPRINTS AND DATA VULNERABILITY

TECHNICAL FIELD

The inventions disclosed herein pertain to systems and methods for managing data in distributed computing environments, focusing on the architecture and operation of software systems that utilize microservices and object-oriented principles to enhance data security and efficiency in cloud-based platforms. These inventions address the design and implementation of software frameworks that control the replication and distribution of data across multiple storage locations, ensuring limited data duplication and improved protection against unauthorized access. The technology encompasses the development of mechanisms within cloud computing systems that regulate data storage and retrieval processes, incorporating algorithms to maintain a predefined number of data copies while enforcing access privileges. This area of technology also involves the structuring of data management solutions that operate across various applications and cloud vendors, providing a cohesive approach to minimizing data vulnerability through controlled data footprint implementations.

DESCRIPTION OF THE RELATED ART

In contemporary cloud computing environments, a significant challenge arises from the proliferation of data copies across multiple storage systems. When sensitive information resides in various locations, each duplicate increases the potential for unauthorized access or loss. This issue stems from the inherent nature of distributed systems, where data replication serves purposes such as redundancy, resilience, and rapid access. However, the absence of strict control over the number and location of these copies complicates efforts to safeguard confidential information, leaving organizations exposed to risks that traditional security measures struggle to address.

Data replication in cloud systems often occurs automatically, driven by mechanisms like data virtualization and caching. For instance, when an application requires access to information stored in a distant data center, the system may create a temporary local copy to reduce latency. While this enhances performance, it also generates additional instances of the data that may persist beyond their intended use. Over time, these copies can accumulate across different servers, networks, or even geographical regions, creating a sprawling network of data footprints that organizations find difficult to track or manage.

The lack of oversight over data replication poses a substantial problem in environments that prioritize disaster recovery and system reliability. Many cloud platforms, such as those employing distributed file systems, mandate multiple copies of data to ensure availability in case of hardware failure or network disruptions. While this approach bolsters system robustness, it amplifies the challenge of protecting sensitive information. Each additional copy represents a potential point of exposure, especially if the system fails to delete outdated or unnecessary duplicates after their purpose concludes.

Another dimension of this problem emerges from the complexity of modern cloud architectures. Applications running in these environments often interact with data stored across multiple repositories, leading to unintentional duplication as different components access and store the same information. This fragmentation obscures visibility into where data resides, making it arduous for organizations to enforce consistent security protocols. Without a clear understanding of all data locations, ensuring compliance with regulatory requirements or internal policies becomes an elusive goal.

The vulnerability introduced by excessive data footprints extends beyond mere replication numbers. Each copy carries metadata and contextual information that can reveal sensitive details about the data's origin, purpose, or content. In scenarios where security measures falter, this metadata can provide attackers with insights to target, even if the primary data remains encrypted. The problem intensifies when copies reside in unsecured or poorly monitored locations, such as temporary caches or third-party systems, where oversight diminishes.

In traditional on-premises setups, physical barriers and centralized control mitigated some of these concerns. Data resided within defined boundaries, such as a secure facility, limiting the scope of replication and access. However, the transition to cloud-based systems erases these physical constraints, replacing them with a fluid, decentralized structure. This shift amplifies the difficulty of maintaining a tight grip on data distribution, as information flows across virtualized environments without the same level of containment.

The reliance on third-party cloud vendors further complicates the issue. Different providers implement varying strategies for data management, including replication policies that may not align with an organization's security objectives. For example, one vendor might prioritize performance by creating numerous local copies, while another focuses on redundancy with mirrored datasets. This inconsistency results in a patchwork of data footprints, each governed by distinct rules, leaving organizations struggling to reconcile these approaches into a unified protection strategy.

The absence of a mechanism to limit data replication also hampers efforts to respond to breaches or leaks. When an incident occurs, identifying and isolating all copies of compromised data proves time-consuming and resource-intensive. Without a comprehensive record of where duplicates exist, containment efforts falter, allowing the impact of a breach to spread. This reactive struggle underscores the proactive need to address data footprint proliferation before it escalates into a larger crisis.

Compounding these challenges, the rapid evolution of cloud technology outpaces the development of tools to manage data sprawl. As systems scale to accommodate growing volumes of information and users, the potential for uncontrolled replication rises. Organizations adopting microservices and distributed architectures encounter this problem with greater frequency, as these designs emphasize modularity and flexibility over centralized control. The resulting environment demands a solution that can adapt to dynamic conditions while imposing order on data distribution.

The need for a resolution to this problem has persisted for years, remaining unmet despite advancements in cloud security. Organizations have long sought a way to balance the benefits of data replication—such as performance and reliability—with the imperative to protect sensitive information. Existing approaches, such as encryption or access controls, address only parts of the issue, leaving the underlying challenge of excessive data footprints unresolved. This gap has fueled a prolonged demand for a technology capable of enforcing strict limits on data copies while maintaining operational efficiency, a need that prior solutions have failed to satisfy comprehensively.

SUMMARY OF THE INVENTION

The invention centers on a system and method designed to manage data replication within cloud computing environments using a microservices-based, object-oriented approach. This technology establishes a framework where data handling occurs through a collection of modular services that interact to regulate the number of data copies. By employing this structure, the system ensures that sensitive information does not proliferate beyond a predetermined limit across various storage locations. Each service within this architecture focuses on specific tasks related to data management, providing a flexible and scalable solution adaptable to diverse cloud platforms.

A key component of this invention involves the encapsulation of data units within a specialized implementation. This implementation treats data as discrete entities, which may consist of entire tables, sections of tables, rows, columns, individual entries, or combinations thereof. By defining data in this granular manner, the system achieves precision in tracking and controlling its distribution. The approach allows for tailored management of different data types, ensuring that the rules applied to replication remain consistent regardless of the data's structure or size.

The system maintains a structured record of all data locations using a table integrated into its core implementation. This table, organized as a stack, queue, or doubly linked list, logs each copy of a data unit along with its specific location in the cloud. The design restricts the table's size to a fixed number of entries, corresponding to the maximum allowable copies of any data unit. When a new copy request arises, the system checks this table to determine if space exists, ensuring that the total number of copies never exceeds the set limit.

When the table reaches its capacity and a new copy request occurs, the system employs a deletion mechanism to remove an existing entry before adding the new one. Several algorithms govern this process, offering flexibility based on operational needs. One option follows a Last In First Out approach, where the most recent copy gets removed to accommodate the new one. Alternatively, a First In First Out method prioritizes deleting the oldest copy, treating the table as a queue where earlier entries exit first.

Another algorithm available within this system uses a Least Recently Used strategy, identifying and removing the copy that has gone the longest without access. Conversely, a Most Recently Used approach targets the copy accessed most recently for deletion, assuming it may no longer be necessary. A Least Frequently Used method also exists, tracking access frequency to eliminate the least-used copy. These options allow the system to adapt to varying application demands, ensuring efficient data management without compromising the replication limit.

Beyond replication control, the system incorporates a robust access privilege mechanism. For every recorded data location, it maintains a separate list detailing the permissions associated with that copy. This list specifies whether a given location allows read-only access, read-write capabilities, or consumption privileges, ensuring that any copy request aligns with predefined security rules. When a new copy enters the table, the system verifies these privileges, preventing unauthorized replication or access across the cloud environment.

The microservices architecture underpinning this invention enables seamless integration with multiple applications and cloud vendors. Each microservice operates independently yet collaborates with others to manage data across diverse platforms. This modularity ensures that the system remains agnostic to specific vendor implementations, providing a unified approach to data footprint limitation regardless of the underlying infrastructure. Applications interacting with the system can request data without needing to know its physical location, as the microservices handle retrieval and replication transparently.

Data stores in this framework connect through the microservices layer, which acts as an intermediary between applications and storage locations. These stores may reside in different regions or operate under distinct vendor protocols, yet the system maintains consistency in how data copies distribute. By centralizing replication logic within the microservices, the invention avoids the fragmentation common in traditional cloud setups, where each store might independently duplicate data without oversight.

A unique aspect of this technology lies in its object-oriented design, which treats data units as objects with associated methods and properties. This approach allows the system to encapsulate replication rules and access controls within each data object, enhancing both security and manageability. Objects carry their own logic for interacting with the table and privilege list, reducing the complexity of maintaining separate processes for each data type or location.

The invention supports dynamic adjustments to the replication limit, allowing administrators to define the maximum number of copies based on specific needs. In some cases, this limit might restrict to a single copy, effectively eliminating duplication entirely. In others, a small number of copies might persist to balance performance and security. This configurability ensures that the system adapts to different organizational priorities, from minimizing exposure to optimizing access speed.

The implementation also accounts for real-time updates to the table and privilege list as data moves or changes. When a copy relocates due to system operations, such as load balancing or maintenance, the table reflects this shift immediately. Similarly, if access privileges adjust—perhaps due to a policy update—the system propagates these changes across all relevant entries, maintaining consistency and control over the data's lifecycle.

Scalability represents another strength of this invention, as the microservices framework accommodates growth in data volume and application complexity. As more applications integrate with the system or additional storage locations come online, new microservices deploy to handle the increased load. This distributed design prevents bottlenecks, ensuring that replication management remains efficient even in expansive cloud environments.

Interoperability with existing cloud technologies enhances the invention's practicality. The system interfaces with standard data virtualization tools and caching mechanisms, adapting their output to fit within the replication constraints. Rather than allowing these tools to create uncontrolled copies, the microservices layer intercepts and regulates their behavior, aligning them with the predefined limits and security protocols.

The invention also provides a mechanism for auditing data locations and access events. By leveraging the table and privilege list, the system generates logs detailing where copies reside and who interacts with them. This feature supports compliance efforts, offering a clear trail of data movements and access attempts that organizations can review to ensure adherence to internal or external standards.

A further refinement involves the handling of metadata associated with data units. The system ensures that metadata, which might reveal contextual details about the data, follows the same replication and access rules as the primary content. This comprehensive approach prevents secondary exposure risks, where metadata might otherwise persist in unintended locations or fall outside security controls.

The technology extends its utility to multi-vendor cloud scenarios, where applications might span several providers with differing replication policies. By imposing a uniform layer of control, the system reconciles these disparities, ensuring that data copies remain consistent and limited regardless of the vendor's native behavior. This cross-platform capability distinguishes the invention in environments where hybrid or multi-cloud strategies prevail.

Another layer of sophistication arises from the system's ability to prioritize certain copies based on operational context. For instance, if a specific location offers faster access for a critical application, the deletion algorithms can weigh this factor, preserving that copy over others. This contextual awareness enhances performance without sacrificing the overarching goal of limiting data footprints.

The invention also anticipates edge cases, such as temporary copies created during processing. Rather than treating these as permanent entries, the system tags them for automatic removal once their task completes, integrating this logic into the table management process. This proactive handling ensures that transient data does not inflate the replication count beyond the intended limit.

In light of the preceding discussion, the following identifies various sample embodiments of the present disclosure to establish a basic understanding of its various components. This summary is not exhaustive, nor does it limit the illustrative embodiments of the inventions described in this document. It is not intended to identify the most critical or essential features or steps of the disclosure, nor to define its scope. Instead, as would be recognized by someone skilled in the field, it seeks to introduce certain concepts of the disclosure in a clear and simple way, acting as a preface to the more detailed explanation that follows. Throughout this application, the specification offers thorough written descriptions of the inventions, including exemplary, non-exhaustive, and non-limiting methods and processes for making and using the inventions. These descriptions are expressed in complete, clear, concise, and precise terms, allowing those skilled in the art to implement and utilize the inventions without undue experimentation, while also indicating the preferred method envisioned for carrying out the inventions.

In some arrangements, a method for managing data replication in a cloud computing environment is provided. A processor executing a microservices-based architecture encapsulates content into a data unit, with the data unit including a list of locations and a list of access privileges. The processor stores the data unit in a memory accessible across a plurality of cloud vendors. Within a footprint table managed by the processor, a plurality of entries is maintained, with each entry representing a copy of the data unit and a corresponding location in the cloud computing environment. The footprint table tracks the corresponding location and an access count for each copy of the data unit. The microservices-based architecture executed by the processor receives a request from an entity to create a new copy of the data unit at a new location in the cloud computing environment.

In some arrangements, the processor verifies that the entity has a write privilege in the list of access privileges of the data unit. The processor determines whether a number of the plurality of entries in the footprint table equals a predefined maximum number. When the number of the plurality of entries equals the predefined maximum number, the processor removes an existing entry from the plurality of entries in the footprint table, with the removing performed by applying a deletion algorithm selected from the group consisting of Last In First Out (LIFO), First In First Out (FIFO), and Least Recently Used (LRU). The processor adds a new entry to the plurality of entries in the footprint table, with the new entry representing the new copy of the data unit at the new location. The processor updates the list of locations in the data unit to include the new location. The processor stores the new copy of the data unit at the new location in the cloud computing environment, thereby limiting a data footprint of the data unit and reducing data vulnerability across the plurality of cloud vendors.

In some arrangements, a method builds upon the previously described method for managing data replication in a cloud computing environment where a processor encapsulates content into a data unit, stores it in memory, maintains a footprint table, tracks copies, receives a request, verifies privileges, determines entry limits, removes entries with a deletion algorithm, adds new entries, updates locations, and stores the new copy to limit the data footprint and reduce vulnerability. The processor defines the content of the data unit as comprising one or more elements selected from the group consisting of a table, a row of a table, a column of a table, and a single entry in a table.

In some arrangements, a method extends the approach where a processor encapsulates content into a data unit with a list of locations and privileges, stores it in memory accessible across cloud vendors, maintains a footprint table with entries for each copy, tracks locations and access counts, receives a request to create a new copy, verifies write privileges, determines if the entry number meets a maximum, removes an entry using a deletion algorithm (LIFO, FIFO, or LRU), adds a new entry, updates the location list, stores the new copy to limit the footprint and reduce vulnerability, and defines the content as a table, row, column, or entry. The processor assigns a unique identifier to the data unit, with the unique identifier distinguishing the data unit from other data units in the cloud computing environment.

In some arrangements, a method further develops the process where a processor encapsulates content into a data unit with locations and privileges, stores it in memory across cloud vendors, maintains a footprint table with entries, tracks locations and access counts, receives a request, verifies write privileges, checks entry limits, removes an entry with a deletion algorithm (LIFO, FIFO, LRU), adds a new entry, updates locations, stores the new copy to limit the footprint and reduce vulnerability, defines the content as a table or part thereof, and assigns a unique identifier. The processor records a creation timestamp in each entry of the plurality of entries in the footprint table, with the creation timestamp indicating when the copy of the data unit was stored at the corresponding location.

In some arrangements, a method advances the technique where a processor encapsulates content into a data unit with a location list and privileges, stores it in memory across vendors, maintains a footprint table, tracks copies with access counts, receives a request, verifies privileges, checks entry numbers, removes an entry using LIFO, FIFO, or LRU, adds a new entry, updates locations, stores the new copy to limit vulnerability, defines content as a table element, assigns a unique identifier, and records a creation timestamp. The processor selects the deletion algorithm as Least Recently Used (LRU) based on the creation timestamp and the access count of each copy of the data unit.

In some arrangements, a method enhances the process where a processor encapsulates content into a data unit with locations and privileges, stores it across cloud vendors, maintains a footprint table with entries, tracks locations and access counts, receives a request, verifies write privileges, determines entry limits, removes an entry with LIFO, FIFO, or LRU, adds a new entry, updates locations, stores the new copy to reduce vulnerability, defines content as a table part, assigns an identifier, records timestamps, and selects LRU based on timestamps and access counts. The processor audits the list of locations in the data unit to generate a log of all corresponding locations of the copies of the data unit across the plurality of cloud vendors.

In some arrangements, a method expands the approach where a processor encapsulates content into a data unit, stores it in memory across vendors, maintains a footprint table, tracks copies, receives a request, verifies privileges, checks entry limits, removes an entry with a deletion algorithm, adds a new entry, updates locations, stores the new copy to limit the footprint, defines content, assigns an identifier, records timestamps, selects LRU, and audits locations. The microservices-based architecture executed by the processor receives a request from a second entity to access an existing copy of the data unit at an existing location in the cloud computing environment. The processor verifies that the second entity has a read privilege in the list of access privileges of the data unit.

In some arrangements, the processor retrieves the existing copy of the data unit from the existing location in the cloud computing environment. The processor increments the access count for the existing copy in the corresponding entry in the footprint table, building on the prior steps of encapsulation, storage, tracking, request handling, privilege verification, entry management, content definition, identifier assignment, timestamp recording, LRU selection, and auditing.

In some arrangements, a method progresses the process where a processor encapsulates content into a data unit with locations and privileges, stores it across vendors, maintains a footprint table, tracks copies, receives a new copy request, verifies write privileges, manages entries with a deletion algorithm, adds and updates entries, stores the new copy, defines content, assigns an identifier, records timestamps, selects LRU, audits locations, and handles an access request with read privilege verification, retrieval, and access count incrementing. The processor moves the existing copy of the data unit from the existing location to a different location in the cloud computing environment. The processor updates the corresponding entry in the footprint table and the list of locations in the data unit to reflect the different location.

In some arrangements, a method refines the technique where a processor encapsulates content into a data unit, stores it across cloud vendors, maintains a footprint table, tracks copies, receives a request, verifies privileges, manages entries, stores a new copy, defines content, assigns an identifier, records timestamps, selects LRU, audits locations, handles an access request, retrieves a copy, increments access counts, and moves the copy with updates. The processor creates a temporary copy of the data unit at a temporary location in the cloud computing environment for a predefined duration. The processor adds a temporary entry to the plurality of entries in the footprint table for the temporary copy. The processor deletes the temporary copy and the temporary entry from the footprint table after the predefined duration expires.

In some arrangements, a method augments the process where a processor encapsulates content into a data unit with locations and privileges, stores it across vendors, maintains a footprint table, tracks copies, receives a request, verifies privileges, manages entries with LIFO, FIFO, or LRU, adds a new entry, updates locations, stores the new copy, defines content, assigns an identifier, records timestamps, selects LRU, audits locations, handles access requests, moves copies, and manages temporary copies with entries and deletion. The processor encrypts the content of the data unit before storing the new copy and the temporary copy in the cloud computing environment.

In some arrangements, a method for managing data replication in a cloud computing environment is comprehensively provided. A processor executing a microservices-based architecture encapsulates content into a data unit, with the data unit including a list of locations and a list of access privileges. The processor defines the content of the data unit as comprising one or more elements selected from the group consisting of a table, a row of a table, a column of a table, and a single entry in a table. The processor assigns a unique identifier to the data unit, with the unique identifier distinguishing the data unit from other data units in the cloud computing environment. The processor stores the data unit in a memory accessible across a plurality of cloud vendors.

In some arrangements, within a footprint table managed by the processor, a plurality of entries is maintained, with each entry representing a copy of the data unit and a corresponding location in the cloud computing environment. The footprint table tracks the corresponding location and an access count for each copy of the data unit. The processor records a creation timestamp in each entry of the plurality of entries in the footprint table, with the creation timestamp indicating when the copy of the data unit was stored at the corresponding location. The microservices-based architecture executed by the processor receives a request from an entity to create a new copy of the data unit at a new location in the cloud computing environment.

In some arrangements, the processor verifies that the entity has a write privilege in the list of access privileges of the data unit. The processor determines whether a number of the plurality of entries in the footprint table equals a predefined maximum number. The processor removes an existing entry from the plurality of entries in the footprint table when the number of the plurality of entries equals the predefined maximum number, with the removing performed by applying a deletion algorithm. The processor selects the deletion algorithm as Least Recently Used (LRU) based on the creation timestamp and the access count of each copy of the data unit. The processor adds a new entry to the plurality of entries in the footprint table, with the new entry representing the new copy of the data unit at the new location.

In some arrangements, the processor updates the list of locations in the data unit to include the new location. The processor encrypts the content of the data unit before storing the new copy. The processor stores the new copy of the data unit at the new location in the cloud computing environment, thereby limiting a data footprint of the data unit and reducing data vulnerability across the plurality of cloud vendors. The processor audits the list of locations in the data unit to generate a log of all corresponding locations of the copies of the data unit across the plurality of cloud vendors.

In some arrangements, the microservices-based architecture executed by the processor receives a request from a second entity to access an existing copy of the data unit at an existing location in the cloud computing environment. The processor verifies that the second entity has a read privilege in the list of access privileges of the data unit. The processor retrieves the existing copy of the data unit from the existing location. The processor increments the access count for the existing copy in the corresponding entry in the footprint table. The processor moves the existing copy of the data unit from the existing location to a different location in the cloud computing environment. The processor updates the corresponding entry in the footprint table and the list of locations in the data unit to reflect the different location.

In some arrangements, the processor creates a temporary copy of the data unit at a temporary location in the cloud computing environment for a predefined duration. The processor adds a temporary entry to the plurality of entries in the footprint table for the temporary copy. The processor encrypts the content of the data unit before storing the temporary copy. The processor stores the temporary copy at the temporary location in the cloud computing environment. The processor deletes the temporary copy and the temporary entry from the footprint table after the predefined duration expires.

In some arrangements, the microservices-based architecture interfaces with a data virtualization tool to regulate creation of additional copies of the data unit by the data virtualization tool, ensuring the additional copies comply with the predefined maximum number. The processor generates a periodic report from the log, with the periodic report detailing the corresponding locations and access counts of all copies of the data unit. The processor adjusts the predefined maximum number based on a system load of the cloud computing environment. The processor tags the temporary copy with metadata indicating a purpose of the temporary copy, with the metadata distinguishable in the log from metadata of the new copy.

In some arrangements, a system for managing data replication in a cloud computing environment is provided. A memory is configured to store a data unit, with the data unit including content, a list of locations, and a list of access privileges. A footprint table is configured to maintain a plurality of entries, with each entry representing a copy of the data unit and a corresponding location in the cloud computing environment, and the footprint table is further configured to track the corresponding location and an access count for each copy. A processor is communicatively coupled to the memory and the footprint table, and the processor is configured to execute a microservices-based architecture.

In some arrangements, the processor encapsulates the content into the data unit. The processor stores the data unit in the memory, with the memory accessible across a plurality of cloud vendors. The processor, via the microservices-based architecture, receives a request from an entity to create a new copy of the data unit at a new location in the cloud computing environment. The processor verifies that the entity has a write privilege in the list of access privileges. The processor determines whether a number of the plurality of entries in the footprint table equals a predefined maximum number.

In some arrangements, the processor removes an existing entry from the plurality of entries in the footprint table when the number of the plurality of entries equals the predefined maximum number, with the removal performed by applying a deletion algorithm selected from the group consisting of Last In First Out (LIFO), First In First Out (FIFO), and Least Recently Used (LRU). The processor adds a new entry to the plurality of entries in the footprint table, with the new entry representing the new copy at the new location. The processor updates the list of locations in the data unit to include the new location. The processor stores the new copy at the new location in the cloud computing environment, thereby limiting a data footprint of the data unit and reducing data vulnerability across the plurality of cloud vendors.

In some arrangements, a system builds on the previously described system where a memory stores a data unit with content, locations, and privileges, a footprint table tracks copies, and a processor encapsulates content, stores the data unit, receives a request, verifies privileges, manages entries with a deletion algorithm, and stores a new copy to limit the footprint. The processor is further configured to define the content of the data unit as comprising one or more elements selected from the group consisting of a table, a row of a table, a column of a table, and a single entry in a table.

In some arrangements, a system extends the approach where a memory stores a data unit, a footprint table tracks copies, and a processor encapsulates content, stores the data unit across vendors, receives a request, verifies privileges, manages entries, stores a new copy, and defines content as a table or part thereof. The processor is further configured to assign a unique identifier to the data unit, with the unique identifier distinguishing the data unit from other data units in the cloud computing environment.

In some arrangements, a system advances the configuration where a memory stores a data unit with locations and privileges, a footprint table tracks copies, and a processor encapsulates content, stores it across vendors, receives a request, verifies privileges, manages entries with LIFO, FIFO, or LRU, stores a new copy, defines content, and assigns an identifier. The processor is further configured to record a creation timestamp in each entry of the plurality of entries in the footprint table, with the creation timestamp indicating when the copy of the data unit was stored at the corresponding location.

In some arrangements, a system refines the setup where a memory stores a data unit, a footprint table tracks copies with access counts, and a processor encapsulates content, stores it, receives a request, verifies privileges, manages entries, stores a new copy, defines content, assigns an identifier, and records timestamps. The processor is further configured to select the deletion algorithm as Least Recently Used (LRU) based on the creation timestamp and the access count of each copy of the data unit.

In some arrangements, a system enhances the design where a memory stores a data unit, a footprint table tracks copies, and a processor encapsulates content, stores it across vendors, receives a request, verifies privileges, manages entries with a deletion algorithm, stores a new copy, defines content, assigns an identifier, records timestamps, and selects LRU. The processor is further configured to audit the list of locations in the data unit to generate a log of all corresponding locations of the copies of the data unit across the plurality of cloud vendors.

In some arrangements, a system progresses the configuration where a memory stores a data unit, a footprint table tracks copies, and a processor encapsulates content, stores it, receives a request, verifies privileges, manages entries, stores a new copy, defines content, assigns an identifier, records timestamps, selects LRU, and audits locations. The processor is further configured to receive, via the microservices-based architecture, a request from a second entity to access an existing copy of the data unit at an existing location in the cloud computing environment. The processor verifies that the second entity has a read privilege in the list of access privileges. The processor retrieves the existing copy from the existing location. The processor increments the access count for the existing copy in the corresponding entry in the footprint table.

In some arrangements, a system builds on the prior setup where a memory stores a data unit, a footprint table tracks copies, and a processor encapsulates content, stores it across vendors, receives a request, verifies privileges, manages entries, stores a new copy, defines content, assigns an identifier, records timestamps, selects LRU, audits locations, and handles an access request with retrieval and incrementing. The processor is further configured to move the existing copy of the data unit from the existing location to a different location in the cloud computing environment. The processor updates the corresponding entry in the footprint table and the list of locations in the data unit to reflect the different location.

In some arrangements, a system comprehensively extends the configuration where a memory stores a data unit with content, locations, and privileges, a footprint table tracks copies with access counts, and a processor encapsulates content, stores it across vendors, receives a request, verifies privileges, manages entries with LIFO, FIFO, or LRU, stores a new copy, defines content, assigns an identifier, records timestamps, selects LRU, audits locations, handles access requests, and moves copies with updates. The processor is further configured to create a temporary copy of the data unit at a temporary location in the cloud computing environment for a predefined duration. The processor adds a temporary entry to the plurality of entries in the footprint table for the temporary copy.

In some arrangements, the processor encrypts the content of the data unit before storing the temporary copy and the new copy at their respective locations. The processor stores the temporary copy at the temporary location. The processor deletes the temporary copy and the temporary entry from the footprint table after the predefined duration expires. The processor, via the microservices-based architecture, interfaces with a data virtualization tool to regulate creation of additional copies of the data unit by the data virtualization tool, ensuring the additional copies comply with the predefined maximum number.

In some arrangements, the processor generates a periodic report from the log, with the periodic report detailing the corresponding locations, access counts, and creation timestamps of all copies of the data unit. The processor adjusts the predefined maximum number dynamically based on a system load of the cloud computing environment. The processor tags the temporary copy with metadata indicating a purpose of the temporary copy, with the metadata distinguishable in the log from metadata of the new copy and the existing copy. The processor prioritizes retention of a specific copy of the data unit at a prioritized location based on a performance metric of the prioritized location, with the performance metric including a latency value for data access by an application in the cloud computing environment.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 is an exemplary system architecture diagram in accordance with one or more embodiments disclosed herein that illustrates the structural arrangement of components for managing data replication in a cloud computing environment. It depicts the interconnections between a processor, memory, footprint table, microservices-based architecture, cloud vendors, and various data copy locations to limit data footprints and enhance security across multiple cloud platforms.

FIGS. 2A-2B are an exemplary flow diagram in accordance with one or more embodiments disclosed herein that illustrates the detailed process of managing data replication in a cloud computing environment using a microservices-based architecture. It depicts the sequential steps from encapsulating data into a unit to adjusting replication limits and tagging temporary copies, highlighting interactions with cloud vendors, privilege verification, and data security measures.

FIGS. 3A-3C are an exemplary sequence diagram in accordance with one or more embodiments disclosed herein that illustrates the interactions between key actors in a cloud computing environment for managing data replication. It details the step-by-step communication flow among components like the processor, microservices-based architecture, memory, and footprint table to encapsulate, store, track, and secure data copies across multiple cloud vendors.

FIGS. 4A-4B are an exemplary class diagram in accordance with one or more embodiments disclosed herein that illustrates the object-oriented structure and relationships of classes involved in managing data replication in a cloud computing environment. It details the attributes, methods, and interconnections of key components such as data units, processors, and microservices to facilitate secure and controlled data handling across multiple cloud vendors.

DETAILED DESCRIPTION

The invention presents a sophisticated system and method for managing data replication in a cloud computing environment, leveraging a microservices-based, object-oriented architecture to address the critical challenges of data sprawl and vulnerability across multiple cloud vendors. At its core, this technology aims to limit the data footprint—defined as the number of copies of a data unit—while enhancing security and operational efficiency in distributed systems. By encapsulating data into a structured Data Unit with embedded lists of locations and access privileges, the invention ensures that sensitive information, such as financial records or personal identifiers, remains tightly controlled and trackable, regardless of where it resides in the cloud ecosystem.

A key component of this system is the Footprint Table, which serves as a centralized ledger for tracking all copies of a Data Unit, maintaining entries that detail each copy's location and access count. This table enforces a predefined maximum number of copies, preventing uncontrolled proliferation that often occurs in traditional cloud setups due to mechanisms like data virtualization or caching. For example, in a scenario where a bank processes customer credit applications, the Footprint Table ensures that only a set number of copies—say three—are ever active, mitigating risks if one copy inadvertently persists in an unsecured location like a temporary cache.

The Processor, acting as the system's orchestrator, executes a suite of operations through a Microservices Based Architecture, a modular framework that enhances scalability and flexibility. This architecture allows individual microservices to handle specific tasks—such as encapsulating data, verifying privileges, or storing copies—enabling the system to adapt seamlessly to diverse cloud platforms like AWS, Azure, or GCP. The Processor's role includes encrypting data before storage, ensuring that even if a copy is accessed improperly, its contents remain protected, a feature critical for compliance with regulations like GDPR or HIPAA.

One unique aspect of the invention is its use of deletion algorithms to manage copy limits within the Footprint Table. Algorithms such as Last In First Out (LIFO), First In First Out (FIFO), and Least Recently Used (LRU) determine which copy to remove when the maximum is reached, based on factors like creation timestamps or access frequency. For instance, LRU might prioritize deleting a rarely accessed copy of a transaction log stored in an AWS region, making room for a new copy needed in Azure, optimizing resource use while maintaining security.

The Data Unit itself is a versatile construct, capable of representing various data forms—entire tables, rows, columns, or single entries—making it adaptable to different use cases, from corporate databases to individual user profiles. Its list of locations tracks each copy's cloud address (e.g., "eu-central-1"), while the privilege list specifies access rights (e.g., "read" for analysts, "write" for admins), enforced rigorously by the Processor. This granularity ensures that a payroll dataset, for example, can be restricted to specific personnel across multiple vendors without risking overexposure.

The invention's Memory component facilitates storage across a plurality of cloud vendors, ensuring that data units and their copies are accessible yet secure in a multi-vendor environment. This could involve storing an encrypted customer database in AWS S3, replicating it to Azure Blob Storage, and caching a temporary copy in GCP, all managed by the Processor to align with the Footprint Table's limits. This cross-vendor compatibility distinguishes the system, reconciling disparate replication policies into a unified, controlled framework.

Security is further bolstered by the Processor's encryption capabilities, applied to both permanent and temporary copies before storage. Temporary copies, created for short-term tasks like generating a financial report, are tagged with metadata (e.g., "Purpose: Analytics") and automatically deleted after a set duration, such as 24 hours, via methods like DeleteTemporaryCopy. This transient management reduces the risk of lingering copies, a common vulnerability in cloud systems where caches might persist unnoticed.

The Microservices Based Architecture interfaces with external entities—Entity and Second Entity—representing users or applications that request data operations, such as creating or accessing copies. These requests are processed through a robust verification process, ensuring only authorized entities proceed, whether it's a bank employee adding a new copy or an analyst retrieving an existing one. This interaction is facilitated by APIs, potentially hosted on platforms like AWS API Gateway, ensuring seamless communication across the distributed system.

A standout feature is the system's integration with a Data Virtualization Tool, which regulates additional copy creation by external systems, ensuring compliance with the Footprint Table's maximum limit. For example, if a virtualization layer like Denodo attempts to spawn extra copies for performance, the Microservices Based Architecture intercepts and limits this, maintaining the invention's strict control. This interoperability enhances the system's applicability in complex, hybrid cloud environments.

Auditing and reporting capabilities are integral, with the Processor generating a Log from the Footprint Table that tracks all copy locations, access counts, and timestamps. This Log, which might be stored in AWS CloudWatch, feeds into a Periodic Report—perhaps a weekly CSV or dashboard—detailing data distribution and usage. Such transparency aids compliance and troubleshooting, allowing administrators to spot anomalies like an unexpectedly high access count in a GCP region.

The invention's adaptability shines in its dynamic adjustment of the maximum copy limit based on system load, handled by the Processor. During peak demand, such as a financial quarter-end, the limit might increase from 3 to 5, calculated via real-time metrics from a service like Azure Monitor, then revert when load subsides. This flexibility ensures performance without compromising the core goal of limiting data footprints.

The Processor's ability to tag temporary copies with metadata adds another layer of precision, distinguishing their purpose (e.g., "Temporary Analysis") from permanent copies in the Log. This could be implemented with a simple key-value pair in a database, enhancing audit trails and ensuring temporary data doesn't masquerade as critical assets. For instance, a tagged copy for a one-off report in GCP would be clearly differentiated from a long-term backup in AWS.

Implementation across multiple cloud vendors is a core strength, with the system reconciling varying vendor policies into a cohesive strategy. Whether it's AWS's S3 replication, Azure's Blob versioning, or GCP's caching, the invention imposes a uniform limit and security protocol, managed by the Processor and Microservices Based Architecture. This vendor-agnostic approach makes it ideal for enterprises operating in hybrid or multi-cloud setups.

The object-oriented design, rooted in classes like Data Unit (400), Footprint Table (406), and Processor (410), provides a modular, scalable foundation. Each class's methods—such as AddCopy or EncryptContent—are executable in languages like Java or Python, with interconnections (e.g., Data Unit to Location) mapped via associations or compositions in a UML framework. This structure supports customization, allowing developers to tweak algorithms or storage logic as needed.

Ultimately, this invention tackles a persistent cloud computing challenge: balancing data availability with security. By limiting copies, enforcing privileges, encrypting content, and providing detailed tracking, it offers a robust solution for industries handling sensitive data—finance or government—across distributed environments. Its unique blend of microservices, object-oriented design, and multi-vendor integration positions it as a forward-thinking tool for modern data management.

Various example embodiments in the disclosure are designed to fulfill the objectives previously mentioned, drawing on the illustrations provided within this disclosure.

These illustrations—FIG. 1's system architecture, FIG. 2's flow diagram, FIG. 3's sequence diagram, and FIG. 4's class diagram—showcase a variety of systems and methods for putting the disclosed concepts into practice, demonstrating how data replication can be controlled, secured, and tracked across cloud vendors. It is understood that different approaches to implementation are feasible, and adjustments to both the structure and operation of these systems and methods are permissible, such as altering the deletion algorithm or storage vendor. Thus, the description elaborates on numerous connections among components—like the Processor to Memory or Microservices Based Architecture to Data Virtualization Tool—which should be understood in a flexible sense. Unless specifically noted otherwise, such connections may be direct or indirect and can be facilitated through either wired means (e.g., internal API calls) or wireless means (e.g., cloud-based messaging queues), reflecting the system's adaptability to diverse technical environments. This document is not intended to limit the form or type of these connections, allowing for implementation variations that align with the invention's core goals of limiting data footprints and enhancing security.

Various types of artificial intelligence are applicable to the invention. Rule-based systems are a type of artificial intelligence that operate on predefined sets of "if-then" rules to make decisions or perform actions based on specific conditions. They rely on a knowledge base of expert-derived rules and an inference engine to apply those rules to input data, producing deterministic outcomes without requiring extensive training data. In the context of the invention, rule-based systems are applicable to the privilege verification and deletion algorithm selection processes handled by the Processor (410). For privilege verification, a rule-based system could evaluate conditions like "if entity ID matches admin role and privilege type is 'write', then allow access," ensuring consistent, transparent access control. Similarly, for selecting a deletion algorithm (e.g., LRU), rules such as "if access count is below 5 and timestamp is oldest, then remove copy" could dictate which Footprint Table (406) entry to delete, aligning with the system's need for precise, predictable copy management. Examples include expert systems like CLIPS or Jess, which could be integrated into the Processor (410) as a lightweight decision module, querying the Data Unit (400)'s privilege list or Footprint Table (406)'s metadata to enforce limits and security policies efficiently.

Machine learning (ML) involves algorithms that learn patterns and make predictions or decisions from data, improving over time with exposure to more examples, without being explicitly programmed for each task. It encompasses supervised learning (using labeled data), unsupervised learning (finding patterns in unlabeled data), and reinforcement learning (learning via trial and error). ML is applicable to optimizing the deletion algorithm selection and adjusting the maximum copy limit based on system load, both managed by the Processor (410). For deletion, an ML model could analyze historical access counts, timestamps, and copy usage patterns from the Footprint Table (406) to predict which algorithm (LIFO, FIFO, LRU) best balances performance and security, adapting to workload changes—e.g., favoring LRU during low-access periods. For load-based limit adjustment, supervised learning could train on system load metrics (e.g., CPU usage from CloudWatch) and copy demand to dynamically set "maxSize," increasing it during peak times like financial audits. Examples include scikit-learn for a Python-based Random Forest model to predict optimal algorithms or TensorFlow for a neural network to adjust limits, integrated into the Processor (410) as a real-time optimization layer.

Expert systems are AI systems that emulate human expertise in a specific domain, using a knowledge base of facts and rules, and an inference engine to reason and solve problems, often applied in decision-making scenarios. They differ from general ML by relying on explicitly coded expert knowledge rather than statistical learning. In the invention, expert systems could enhance the auditing and reporting functions of the Processor (410) and Log (422). For auditing, an expert system could encode rules like "if a copy's access count exceeds 50 in one region, flag for review," analyzing Footprint Table (406) data to detect anomalies (e.g., a breach attempt), then updating the Log (422). For Periodic Report (424) generation, it could apply domain-specific logic—e.g., "if locations span more than 3 vendors, highlight compliance risks"—to produce detailed, actionable summaries. Examples include tools like Drools, which could run on a Java-based Processor (410) to process Footprint Table (406) entries and generate reports, leveraging banking or security expertise to ensure regulatory adherence and operational insight.

Reinforcement learning (RL) is an AI approach where an agent learns to make decisions by interacting with an environment, receiving rewards or consequences based on actions, and optimizing a cumulative reward over time through trial and error. It excels in dynamic, adaptive scenarios without predefined datasets. RL is applicable to the Processor (410)'s dynamic adjustment of the Footprint Table (406)'s maximum copy limit and copy prioritization based on performance metrics. For limit adjustment, an RL agent could learn from system load data (e.g., latency from Azure Monitor) and reward signals (e.g., reduced latency as positive, increased vulnerability as negative) to set "maxSize," adapting from 3 to 5 during high demand. For prioritization, RL could optimize retention of copies at high-performance locations (e.g., low-latency AWS regions), learning from access speed rewards. Examples include OpenAI Gym with a Q-learning algorithm, deployable in Python on the Processor (410), training on real-time cloud metrics to balance copy limits and performance, enhancing the system's responsiveness to operational needs.

These AI types-rule-based systems, machine learning, expert systems, and reinforcement learning-offer tailored solutions to specific aspects of the invention, from deterministic privilege checks to adaptive copy management, leveraging tools like CLIPS, TensorFlow, Drools, and OpenAI Gym to implement a secure, efficient, and scalable data replication framework.

The system architecture diagram for FIG. 1 represents a comprehensive framework designed to manage data replication within a cloud-based infrastructure, encompassing a variety of interconnected components that collectively facilitate the invention's operation across multiple cloud vendors. At the core of this diagram lies the Cloud Computing Environment (100), which serves as the overarching container for all system elements, providing a distributed platform where data management occurs. This environment could be implemented as a hybrid cloud setup, integrating public clouds like Amazon Web Services (AWS), Microsoft Azure, and Google Cloud Platform (GCP), alongside private cloud instances managed by an enterprise. Within this environment, the Memory (102) is depicted as a critical storage component, directly linked to the Cloud Computing Environment (100), and it houses the Data Unit (104). The Memory (102) might be realized as a distributed memory system, such as a combination of RAM on virtual machines and persistent storage like AWS S3 buckets or Azure Blob Storage, capable of storing sensitive data such as customer records or financial transactions.

The Data Unit (104), residing within the Memory (102), represents the encapsulated data being managed, including content like a database table of social security numbers, a list of locations where copies are stored (e.g., specific server addresses in AWS or Azure), and access privileges defining who can read or write the data (e.g., roles like "admin" or "user"). Connected to the Cloud Computing Environment (100) is the Footprint Table (106), a structured repository that maintains a plurality of entries, each detailing a copy of the Data Unit (104) and its corresponding location. This could be implemented as a relational database table hosted on a service like AWS RDS, with columns for copy identifiers, IP addresses (e.g., 192.168.1.1), and access counts tracking usage frequency. The Footprint Table (106) links to the Processor (108), which acts as the central processing hub, communicatively coupled to both the Memory (102) and the Footprint Table (106). The Processor (108) could be a virtualized CPU instance, such as an AWS EC2 instance or an Azure Virtual Machine, running the logic to manage data replication.

The Processor (108) also integrates with the Microservices-Based Architecture (110), a modular framework that could be deployed using containerized services like Docker on Kubernetes, with individual microservices handling tasks such as request processing or privilege verification. This architecture connects to the Entity (118), representing an external actor like a bank employee or an automated application requesting data operations, potentially interfacing via an API endpoint hosted on a service like AWS API Gateway. The Cloud Computing Environment (100) extends its connections to multiple cloud vendors, including Cloud Vendor 1 (112), Cloud Vendor 2 (114), and Cloud Vendor N (116), which might be exemplified by AWS, Azure, and GCP, respectively, each hosting distinct data storage and processing capabilities. These vendors link to specific copy locations: Cloud Vendor 1 (112) connects to the New Copy Location (120) and Existing Copy Location (122), which could be S3 buckets or Azure data centers storing newly created or pre-existing data copies (e.g., a backup of customer profiles); Cloud Vendor 2 (114) connects to the Different Copy Location (124), such as an Azure region where a copy is relocated (e.g., a moved transaction log); and Cloud Vendor N (116) connects to the Temporary Copy Location (126), potentially a GCP temporary storage bucket for short-term data processing (e.g., a cached report).

The Processor (108) maintains direct connections to these copy locations—New Copy Location (120), Existing Copy Location (122), Different Copy Location (124), and Temporary Copy Location (126)—enabling it to store, retrieve, or move data copies as needed, such as placing a new copy of a payroll file in an AWS bucket or shifting an existing copy to an Azure region for load balancing. The Microservices-Based Architecture (110) also interfaces with the Data Virtualization Tool (128), which could be a tool like Denodo or VMware vSphere, managing virtualized data access across vendors to ensure compliance with replication limits. The Processor (108) further connects to the Log (130), a record of data locations and activities that might be implemented as a log file in an AWS CloudWatch instance, detailing copy locations (e.g., "us-east-1") and access counts (e.g., 15 reads). From the Log (130), the Periodic Report (132) is derived, which could be a generated PDF or dashboard in a tool like Tableau, summarizing data distribution and usage across the system (e.g., a weekly report of copy locations and access frequencies).

This interconnected architecture illustrates a robust system where the Cloud Computing Environment (100) unifies diverse components, the Processor (108) orchestrates operations via the Microservices-Based Architecture (110), and data is managed across multiple vendors and locations, with the Footprint Table (106) and Memory (102) ensuring precise tracking and storage. Examples like AWS for Cloud Vendor 1 (112), an EC2-hosted Processor (108), and a Kubernetes-deployed Microservices-Based Architecture (110) provide concrete implementations, demonstrating how the system can be realized in a real-world cloud ecosystem.

The flow diagram represented in FIGS. 2A-2B provide an exhaustive visual representation of the operational process for managing data replication within a cloud computing environment, meticulously detailing each step involved in the invention's execution from inception to completion. The process commences with the initiation of the data replication management procedure, where the system begins its operational sequence to handle sensitive data across multiple cloud platforms (200). This starting point could be triggered by an application needing to secure and distribute data, such as a banking system preparing to manage customer transaction records across AWS, Azure, and GCP, setting the stage for a controlled replication workflow.

Following the start, a processor executing a microservices-based architecture encapsulates content into a data unit, which includes a list of locations and a list of access privileges (202). This step might involve the processor, running on an AWS EC2 instance, taking raw data like a spreadsheet of employee payroll details and structuring it into an object-oriented format, embedding metadata such as storage locations (e.g., "us-west-2" region) and access rights (e.g., "read-only for HR"). The processor then defines the content of the data unit as comprising one or more elements selected from a table, a row of a table, a column of a table, or a single entry in a table (204). For instance, this could mean specifying that the data unit contains a single column of social security numbers extracted from a larger database, implemented using a JSON schema within a microservice dedicated to data formatting.

Next, the processor assigns a unique identifier to the data unit, distinguishing it from other data units in the cloud computing environment (206). This could be executed by generating a UUID (e.g., "123e4567-e89b-12d3-a456-426614174000") via a microservice running on Kubernetes, ensuring each payroll dataset is uniquely trackable across distributed systems. The processor stores the data unit in a memory accessible across multiple cloud vendors (208). This step might involve placing the data unit into a distributed storage solution like AWS S3 buckets replicated to Azure Blob Storage and GCP Cloud Storage, using APIs to ensure seamless accessibility across these platforms.

The process continues as the processor maintains a plurality of entries in a footprint table, with each entry representing a copy of the data unit and its corresponding location in the cloud computing environment (210). This could be implemented as a MySQL database hosted on AWS RDS, where each row logs a copy's details, such as "Copy 1 at us-east-1" with an IP address. The footprint table tracks the location and access count for each copy (212). For example, it might record that "Copy 1" at an AWS location has been accessed 10 times, using a counter updated by a tracking microservice. The processor records a creation timestamp for each entry in the footprint table, indicating when the copy was stored at its location (214). This might involve adding a timestamp like "2025 Mar. 18 10:00:00 UTC" to each database row, captured via a time synchronization service like NTP.

The flow advances when the microservices-based architecture receives a request from an entity to create a new copy at a new location (216). This could occur when a bank employee submits a request via an API endpoint (e.g., REST API on AWS API Gateway) to replicate payroll data to a new Azure region. The processor verifies that the entity has a write privilege in the data unit's access privileges (218). This step might use an authentication microservice checking against an IAM policy (e.g., AWS IAM) to confirm the employee's "write" role. A decision point follows where the processor determines whether the number of entries in the footprint table equals a predefined maximum number (220). For instance, if the limit is set to 3 copies, the processor queries the database and compares the count (e.g., 3 existing copies) against this threshold.

If the number of entries equals the maximum, the processor removes an existing entry from the footprint table using a deletion algorithm (222). This could involve a microservice executing a SQL DELETE command on the oldest entry based on a chosen algorithm. The processor selects the deletion algorithm as Least Recently Used (LRU) based on the creation timestamp and access count (224). For example, it might identify the copy with the oldest timestamp (e.g., "2025 Mar. 17") and lowest access count (e.g., 2) using a sorting algorithm in Python, then remove it. The processor adds a new entry to the footprint table for the new copy at the new location (226). This could mean inserting a new row into the RDS table with details like "Copy 4 at eu-central-1."

The processor updates the list of locations in the data unit to include the new location (228). This might involve appending "eu-central-1" to a JSON array within the data unit, synchronized across all storage instances. The processor encrypts the content of the data unit before storing the new copy (230). Using a library like OpenSSL, it could apply AES-256 encryption to the payroll column, ensuring security during transit. The processor stores the new copy at the new location in the cloud computing environment (232). This step might use an Azure SDK to upload the encrypted data to a Blob Storage container, completing the replication while limiting the footprint.

The process progresses as the processor audits the list of locations to generate a log of all copy locations (234). This could involve a microservice querying the footprint table and writing a CSV file to AWS CloudWatch Logs, listing all regions (e.g., "us-east-1, eu-central-1"). The microservices-based architecture receives a request from a second entity to access an existing copy at an existing location (236). For example, an HR manager might request access to the payroll copy in "us-east-1" via a web portal. The processor verifies that the second entity has a read privilege (238). This might check an LDAP directory to confirm the manager's "read" permission.

The processor retrieves the existing copy from the existing location (240). This could use an S3 GET request to fetch the encrypted payroll file. The processor increments the access count for the existing copy in the footprint table (242). For instance, it updates the database to reflect 11 accesses for "Copy 1." The processor moves the existing copy from the existing location to a different location (244). This might involve transferring the file from "us-east-1" to "us-west-2" using an AWS S3 copy command for load balancing. The processor updates the footprint table and the data unit's location list to reflect the different location (246). This could update the database and JSON array to show "us-west-2" instead of "us-east-1."

The flow continues as the processor creates a temporary copy at a temporary location for a predefined duration (248). For example, it might generate a cached copy in a GCP bucket for 24 hours to support a report generation task. The processor adds a temporary entry to the footprint table for the temporary copy (250). This could insert a row with "Temp Copy at asia-south1" into the RDS table. The processor encrypts the content before storing the temporary copy (252). Using the same AES-256 method, it secures the temporary data. The processor stores the temporary copy at the temporary location (254). This might upload the encrypted file to GCP Cloud Storage.

The processor deletes the temporary copy and its entry from the footprint table after the duration expires (256). A scheduled Lambda function could trigger this deletion after 24 hours, removing the file and database row. The microservices-based architecture interfaces with a data virtualization tool to regulate additional copy creation (258). This might integrate with Denodo to block unauthorized copies beyond the maximum, using API calls. The processor generates a periodic report from the log, detailing locations and access counts (260). This could produce a weekly PDF via a reporting microservice, summarizing all copy data.

The processor adjusts the predefined maximum number based on system load (262). For instance, it might increase the limit from 3 to 5 during peak usage, calculated by a load-monitoring service. The processor tags the temporary copy with metadata indicating its purpose (264). This could add a tag like "Purpose: Reporting" to the GCP file, distinguishable in the log from permanent copies. The process concludes with the completion of the data replication management workflow (266). This end point signifies that all replication, security, and tracking tasks are finalized, readying the system for the next cycle, such as managing a new dataset like inventory records.

This detailed flow in FIGS. 2A-2B encapsulate a robust, step-by-step process executable across real-world cloud platforms, leveraging microservices, encryption, and database management to implement the invention's innovative approach to data replication control. Each step builds logically on the previous, ensuring a cohesive and secure operation from data encapsulation to dynamic limit adjustment, adaptable to diverse use cases like financial systems or data management.

The sequence diagram depicted in FIGS. 3A-3C offer a comprehensive view of the interactions among various actors within a cloud computing environment to execute the invention's method for managing data replication, providing a meticulous breakdown of each communication step from initiation to completion. The process begins when the Cloud Computing Environment sends a start signal to the Processor to kick off the data replication management process (300). This could be implemented as an automated trigger from a cloud management platform like AWS CloudFormation, signaling the Processor—an EC2 instance—to begin handling a dataset, such as a company's financial records. The Processor then requests the Microservices Based Architecture to encapsulate content into a data unit, complete with a list of locations and access privileges (302). This might involve a microservice running on Kubernetes invoking a data encapsulation function, taking raw data like a CSV file and structuring it into an object with embedded metadata, such as storage locations (e.g., "us-east-1") and privilege rules (e.g., "write for admins").

The Microservices Based Architecture returns the encapsulated data unit to the Processor, confirming the creation of this structured entity (304). This return could be a JSON response delivered via an internal API call, ensuring the Processor has the fully formed data unit. The Processor defines the data unit's content as a table, row, column, or entry and assigns it a unique identifier (306). For example, it might designate the content as a column of transaction IDs and generate a UUID using a Python library, ensuring uniqueness across the cloud environment. The Processor sends the data unit to the Memory for storage across multiple cloud vendors (308). This could involve an AWS SDK command to distribute the data unit to S3 buckets in AWS, Azure Blob Storage, and GCP Cloud Storage, ensuring vendor-agnostic accessibility.

The Memory confirms storage completion to the Processor, signaling that the data unit is securely placed across these platforms (310). This confirmation might be an HTTP 200 response from each storage service, aggregated by a storage management microservice. The Processor instructs the Footprint Table to maintain entries for data unit copies, each entry noting a copy's location and access count (312). Implemented as a PostgreSQL database on AWS RDS, the Footprint Table could create rows like "Copy 1, us-west-2, 5 accesses." The Footprint Table confirms this maintenance to the Processor, ensuring the tracking structure is active (314). This confirmation could be a database acknowledgment via a JDBC connection.

The Processor requests the Footprint Table to record creation timestamps for each entry, marking when each copy was stored (316). This might involve a SQL UPDATE command adding timestamps like "2025 Mar. 18 14:30:00 UTC" to each row, synchronized with a cloud time service. The Footprint Table confirms this recording to the Processor, completing the temporal tracking setup (318). An acknowledgment message via a message queue like RabbitMQ could facilitate this step. An Entity, such as a system administrator, sends a request to the Microservices Based Architecture to create a new copy at a new location (320). This could be an API POST request to an endpoint hosted on AWS API Gateway, specifying a new Azure region.

The Microservices Based Architecture forwards this request to the Processor, relaying the Entity's intent (322). This forwarding might use an internal REST call within the microservices cluster. The Processor verifies the Entity's write privilege against the data unit's access privileges (324). This could involve querying an IAM system like AWS IAM to check if the admin's role includes "write" permissions. The Processor queries the Footprint Table to determine if the entry count equals a predefined maximum number, say 3 copies (326). A SQL SELECT COUNT( ) query could retrieve this count from the database.

The Footprint Table returns the entry count status to the Processor, indicating whether the limit is reached (328). This return might be a numeric response (e.g., "3") via a database driver. If the maximum is reached, the Processor instructs the Footprint Table to remove an existing entry using the Least Recently Used (LRU) algorithm based on timestamps and access counts (330). A microservice could execute a DELETE command targeting the copy with the oldest timestamp and lowest access count, identified via a sorting function. The Footprint Table confirms this removal to the Processor, ensuring space for a new entry (332). This confirmation could be a SQL transaction commit message.

The Processor adds a new entry to the Footprint Table for the new copy at the new location (334). This might insert a row like "Copy 4, eu-west-1, 0 accesses" using an INSERT command. The Footprint Table confirms this addition to the Processor, validating the update (336). A database acknowledgment ensures reliability. The Processor updates the data unit's location list with the new location (338). This could modify a JSON field in the data unit, appending "eu-west-1," synced via a Redis cache. The Processor encrypts the data unit content before storage (340). Using a library like Bouncy Castle, it might apply AES-256 encryption to secure the financial data.

The Processor sends the encrypted new copy to the Memory for storage at the new location (342). An Azure SDK PUT request could upload the encrypted file to a Blob Storage container. The Memory confirms this storage to the Processor, completing the replication step (344). An HTTP 201 response from Azure could signal success. The Processor requests the Footprint Table to audit locations and generate a log of all copy locations (346). A microservice might run a SELECT query and write results to an AWS CloudWatch log file, listing regions like "us-west-2, eu-west-1."

A Second Entity, such as an analyst, sends a request to the Microservices Based Architecture to access an existing copy at an existing location (350). This could be a GET request to an API endpoint for data in "us-west-2." The Microservices Based Architecture forwards this access request to the Processor (352). An internal gRPC call might handle this relay efficiently. The Processor verifies the Second Entity's read privilege against the data unit's access privileges (354). This could check an LDAP entry to confirm the analyst's "read" role.

The Processor requests the Memory to retrieve the existing copy from its location (356). An S3 GET command might fetch the encrypted file from "us-west-2." The Memory returns the existing copy to the Processor (358). This return could be the file content delivered via a secure HTTPS connection. The Processor updates the access count in the Footprint Table for the existing copy (360). A SQL UPDATE might increment the count from 5 to 6 for that entry. The Footprint Table confirms this update to the Processor (362). A database commit response ensures accuracy.

The Processor requests the Memory to move the existing copy to a different location (364). An AWS S3 copy command might transfer it to "ap-southeast-1" for load balancing. The Memory confirms this move to the Processor (366). An HTTP 200 response from the new location validates the transfer. The Processor updates the Footprint Table and data unit with the different location (368). This could involve updating the database row and JSON list to reflect "ap-southeast-1." The Footprint Table confirms this update completion to the Processor (370). A transaction acknowledgment ensures consistency.

The Processor creates a temporary copy and sends it to the Memory with a predefined duration, such as 12 hours (372). This might generate a cached copy in a GCP bucket for a temporary report task. The Memory confirms this temporary copy storage to the Processor (374). A GCP API response signals completion. The Processor encrypts the temporary copy content (376). AES-256 encryption could secure this transient data. The Processor adds a temporary entry to the Footprint Table (378). An INSERT command might add "Temp Copy, asia-south1, 0 accesses."

The Footprint Table confirms this temporary entry addition to the Processor (380). A database acknowledgment ensures the entry is logged. After the duration expires, the Processor instructs the Memory to delete the temporary copy (382). A scheduled Lambda function might trigger this removal after 12 hours. The Memory confirms this deletion to the Processor (384). A DELETE response from GCP validates the action. The Processor removes the temporary entry from the Footprint Table (386). A SQL DELETE command clears the row. The Footprint Table confirms this removal to the Processor (388). A commit message finalizes the cleanup.

The Microservices Based Architecture interfaces with the Data Virtualization Tool to regulate additional copy creation, ensuring compliance with the maximum number (390). This could involve API calls to a tool like Denodo, blocking excess copies. The Data Virtualization Tool acknowledges this regulation to the Microservices Based Architecture (392). A success response confirms enforcement. The Processor requests the Footprint Table to generate a periodic report from the log, detailing locations and access counts (394). A reporting microservice might query the log and produce a CSV file. The Footprint Table returns this periodic report to the Processor (395). The file delivery via S3 completes this step.

The Processor adjusts the maximum number based on system load (396). A load-monitoring microservice might increase it from 3 to 4 during peak demand, calculated via CloudWatch metrics. The Processor tags the temporary copy with metadata indicating its purpose in the Footprint Table (397). This could add a tag like "Purpose: Analytics" via a SQL UPDATE, distinct from permanent copy metadata. The Footprint Table confirms this metadata tagging to the Processor (398). A database response ensures the tag is applied. Finally, the Processor signals the Cloud Computing Environment that the process is complete (399). This could be an event notification to CloudFormation, closing the replication cycle and preparing for the next dataset, such as inventory records.

The sequence diagram in FIGS. 3A-3C encapsulate a detailed, interactive workflow, implementable with modern cloud technologies like AWS, Azure, and microservices frameworks, ensuring precise data replication management across distributed environments. Each step leverages specific tools and protocols, from encryption libraries to database queries, creating a robust, scalable process adaptable to various enterprise needs.

The class diagram depicted in FIGS. 4A-4B provide a comprehensive blueprint of the object-oriented design for the invention, meticulously outlining the classes, their attributes, methods, and interconnections that collectively enable the management of data replication within a cloud computing environment. At the core is the Data Unit (400) class, which serves as the foundational entity for encapsulating data to be managed. This class includes attributes such as an "id" of type String, which could be a unique identifier like a UUID (e.g., "550e8400-e29b-41d4-a716-446655440000") to distinguish each data unit across the system, a "content" of type Any that might represent diverse data forms such as a table of customer transactions or a single financial entry, a "locations" attribute as a List<Location> to track where copies reside (e.g., AWS region "us-east-1" or Azure "eu-west-1"), and a "privileges" attribute as a List<Privilege> defining access rights (e.g., "read" or "write" for specific user roles). The methods of Data Unit (400) include CreateDataUnit, which could be implemented in Java to instantiate a new data unit from raw input like a CSV file, AddPrivilege to append access rules (e.g., adding "write" for an admin via a method call), and HasPrivilege to check permissions (e.g., returning true if a user has "read" access), forming a robust structure for data encapsulation.

Closely tied to Data Unit (400) is the Location (402) class, which defines the specifics of where data copies are stored, featuring attributes like "cloudAddress" as a String (e.g., an IP address "192.168.1.10" or region "ap-southeast-1"), "createdAt" as a Timestamp (e.g., "2025 Mar. 18 09:15:00 UTC") to log when a copy was placed, and "accessCount" as an Integer to track usage (e.g., 7 accesses). This class lacks methods, serving as a data container, and its instances are aggregated within the "locations" list of Data Unit (400), creating a one-to-many composition relationship that might be implemented using an ArrayList in Java to store multiple storage points for a single data unit. Similarly, the Privilege (404) class complements Data Unit (400) with attributes "type" as a String (e.g., "read", "write", or "consume") and "entityId" as a String (e.g., "user123" or "role: admin"), defining who can interact with the data unit. Also without methods, Privilege (404) instances are held in the "privileges" list of Data Unit (400), enabling dynamic privilege management, such as adding a new "consume" privilege via a database update.

The Footprint Table (406) class is a pivotal component for tracking data copies, with attributes including "entries" as a List<Entry> to hold records of each copy (e.g., a list of database rows), "maxSize" as an Integer to set a replication limit (e.g., 3 copies), and "deletionAlgorithm" as a String to specify removal logic (e.g., "LRU" or "FIFO"). Its methods are extensive, reflecting its central role: InitializeSystem might set up the table with a max size of 4 using a constructor in C, AddCopy could insert a new row into a MySQL table hosted on AWS RDS with details like "Copy 1, us-west-2", RemoveEntry might delete a row based on the LRU algorithm using a SQL query, AccessCopy could fetch data via a SELECT statement, MoveCopy might update a row's location field, AuditLocations could return a list of all copy addresses, and CreateTemporaryCopy/DeleteTemporaryCopy might manage transient entries with a timer in Node.js. Footprint Table (406) composes the Entry (408) class, which has attributes "dataUnit" as a Data Unit (400) reference (e.g., linking to a specific payroll dataset) and "location" as a Location (402) reference (e.g., "eu-central-1"), forming a one-to-many relationship where each entry ties a data unit to its storage spot, potentially implemented as a foreign key in a relational database.

The Processor (410) class orchestrates the system's operations, lacking attributes but boasting a rich set of methods to interact with other classes. Methods like EncapsulateContent might use a Python script to wrap a JSON file into a Data Unit (400), StoreDataUnit could invoke an S3 PUT request to save it in Memory (414), MaintainEntries might sync Footprint Table (406) with current copy states, and VerifyPrivilege could query an LDAP server to check permissions. CheckEntryLimit might compare Footprint Table (406)'s entry count against "maxSize" using a simple if-statement, RemoveEntry could call Footprint Table (406)'s removal logic, and AddNewEntry might insert via JDBC. UpdateLocations could modify a Data Unit (400)'s JSON list, EncryptContent might use OpenSSL for AES-256 encryption, and StoreCopy could distribute encrypted data across vendors like Azure. Additional methods like AuditLocations, RetrieveCopy, IncrementAccessCount, MoveCopy, CreateTemporaryCopy, DeleteTemporaryCopy, AdjustMaxSize, and TagTemporaryCopy enable comprehensive management, potentially coded in a microservices framework like Spring Boot, associating Processor (410) with Data Unit (400), Footprint Table (406), and Memory (414).

The Microservices Based Architecture (412) class facilitates request handling, with methods but no attributes. ReceiveRequest might process an HTTP POST from Entity (416) via an AWS API Gateway endpoint, ForwardRequest could relay it to Processor (410) using gRPC, InterfaceWithDataVirtualization might sync with Data Virtualization Tool (420) via REST, and MicroserviceHandler could route tasks in a Dockerized environment, associating it with Entity (416), Second Entity (418), and Data Virtualization Tool (420). Memory (414) class handles storage operations, with methods like Store to save a Data Unit (400) across S3 and Blob Storage, StoreCopy to place encrypted copies, Retrieve to fetch via an SDK, MoveCopy to transfer data between regions, and DeleteCopy to remove temporary copies, implemented with cloud APIs and associating with Processor (410).

Entity (416) and Second Entity (418) classes represent external actors, each with "id" as a String (e.g., "emp001") and "privileges" as a List<String> (e.g., ["read", "write"]), and a SendRequest method to initiate actions via Microservices Based Architecture (412), perhaps as API clients in a web app. Data Virtualization Tool (420) class, with a RegulateCopies method, might use a tool like Denodo to enforce copy limits, associating with Microservices Based Architecture (412). Log (422) class tracks locations, access counts, and timestamps (e.g., "us-east-1, 10, 2025 Mar. 18"), with GenerateReport creating a CSV via a script, associating with Processor (410). Periodic Report (424) class holds report content as a String (e.g., a formatted summary), associating with Log (422).

The diagram depicted in FIGS. 4A-4B map out a robust, interconnected class structure, implementable in languages like Java or C with cloud integrations, ensuring the invention's data replication management is scalable, secure, and vendor-agnostic through precise object relationships and method implementations.

Pseudocode exemplars for implementing various aspects of this disclosure are set forth below with explanations for reference.

```
//Define data structures for the invention
DEFINE STRUCTURE DataUnit {
  STRING id
  ANY content//Can be table, row, column, etc.
  LIST<Location> locations
  LIST<Privilege> privileges
}
DEFINE STRUCTURE Location {
  STRING cloudAddress
  TIMESTAMP createdAt
  INTEGER accessCount
}
DEFINE STRUCTURE Privilege {
  STRING type//"read", "write", "consume"
  STRING entityId
}
DEFINE STRUCTURE FootprintTable {
  LIST<Entry> entries
  INTEGER maxSize
  STRING deletionAlgorithm//"LIFO", "FIFO", "LRU",
    "MRU", "LFU"
}
DEFINE STRUCTURE Entry {
  DataUnit dataUnit
  Location location
}
//Initialize the system
FUNCTION InitializeSystem(maxCopies, algorithm) {
  FootprintTable table
  table.maxSize=maxCopies
  table.deletionAlgorithm=algorithm
  table.entries=EMPTY_LIST
  RETURN table
}
//Encapsulate data into a DataUnit
FUNCTION CreateDataUnit(content) {
  DataUnit unit
  unit.id=GenerateUniqueID( )
  unit.content=content
  unit.locations=EMPTY_LIST
  unit.privileges=EMPTY_LIST
  RETURN unit
}
//Add privilege to DataUnit
FUNCTION AddPrivilege(unit, privilegeType, entity) {
  Privilege priv
  priv.type=privilegeType
  priv.entityId=entity
  unit.privileges.Append(priv)
}
//Check if privilege exists for an entity
FUNCTION HasPrivilege(unit, privilegeType, entity) {
  FOR EACH priv IN unit.privileges {
    IF priv.type=privilegeType AND priv.entityId=entity
      THEN
      RETURN TRUE
  }
  RETURN FALSE
}
//Add a copy of DataUnit to a location
FUNCTION AddCopy(table, unit, cloudAddress, requestingEntity) {
  IF NOT HasPrivilege(unit, "write", requestingEntity)
    THEN
    RETURN ERROR("Insufficient privileges")
  Location loc
  loc.cloudAddress=cloudAddress
  loc.createdAt=CurrentTimestamp( )
  loc.accessCount=0
  IF table.entries.Size( )>=table.maxSize THEN
    RemoveEntry(table)
  Entry entry
  entry.dataUnit=unit
  entry.location=loc
  table.entries.Append(entry)
  unit.locations.Append(loc)
  StoreDataAtLocation(unit.content, cloudAddress)
}
//Remove an entry based on deletion algorithm
FUNCTION RemoveEntry(table) {
  Entry entryToRemove
  IF table.deletionAlgorithm="LIFO" THEN
    entryToRemove=table.entries.Last( )
  ELSE IF table.deletionAlgorithm="FIFO" THEN
    entryToRemove=table.entries.First( )
  ELSE IF table.deletionAlgorithm="LRU" THEN
    entryToRemove=FindLeastRecentlyUsed(table.entries)
  ELSE IF table.deletionAlgorithm="MRU" THEN
    entryToRemove=FindMostRecentlyUsed(table.entries)
  ELSE IF table.deletionAlgorithm="LFU" THEN
    entryToRemove=FindLeastFrequentlyUsed
      (table.entries)
```

```
    DeleteDataAtLocation(entryToRemove.dataUnit.content, entryToRemove.location.cloudAddress)
    table.entries.Remove(entryToRemove)
    entryToRemove.dataUnit.locations.Remove(entryToRemove.location)
}
//Helper functions for deletion algorithms
FUNCTION FindLeastRecentlyUsed(entries) {
    Entry oldest
    TIMESTAMP minTime=INFINITY
    FOR EACH entry IN entries {
        IF entry.location.createdAt<minTime THEN
            minTime=entry.location.createdAt
            oldest=entry
    }
    RETURN oldest
}
FUNCTION FindMostRecentlyUsed(entries) {
    Entry newest
    TIMESTAMP maxTime=0
    FOR EACH entry IN entries {
        IF entry.location.createdAt>maxTime THEN
            maxTime=entry.location.createdAt
            newest=entry
    }
    RETURN newest
}
FUNCTION FindLeastFrequentlyUsed(entries) {
    Entry leastUsed
    INTEGER minCount=INFINITY
    FOR EACH entry IN entries {
        IF entry.location.accessCount<minCount THEN
            minCount=entry.location.accessCount
            leastUsed=entry
    }
    RETURN leastUsed
}
//Access a data copy
FUNCTION AccessCopy(table, unitId, cloudAddress, requestingEntity) {
    FOR EACH entry IN table.entries {
        IF entry.dataUnit.id=unitId AND entry.location.cloudAddress=cloudAddress THEN
            IF NOT HasPrivilege(entry.dataUnit, "read", requestingEntity) THEN
                RETURN ERROR("Insufficient privileges")
            entry.location.accessCount=entry.location.accessCount+1
            RETURN RetrieveDataFromLocation(cloudAddress)
    }
    RETURN ERROR("Copy not found")
}
// Move a copy to a new location
FUNCTION MoveCopy(table, unitId, oldAddress, newAddress, requestingEntity) {
  FOR EACH entry IN table.entries {
    IF entry.dataUnit.id = unitId AND entry.location.cloudAddress = oldAddress THEN
      IF NOT HasPrivilege(entry.dataUnit, "write", requestingEntity) THEN
        RETURN ERROR("Insufficient privileges")
      Data content = RetrieveDataFromLocation(oldAddress)
      StoreDataAtLocation(content, newAddress)
      DeleteDataAtLocation(content, oldAddress)
      entry.location.cloudAddress = newAddress
      entry.location.createdAt = CurrentTimestamp( )
      entry.dataUnit.locations.UpdateLocation(oldAddress, newAddress)
      RETURN SUCCESS
  }
```

```
    RETURN ERROR("Copy not found")
}
//Audit data locations
FUNCTION AuditLocations(table, unitId) {
    LIST<Location> locations
    FOR EACH entry IN table.entries {
        IF entry.dataUnit.id=unitId THEN
            locations.Append(entry.location)
    }
    RETURN locations
}
//Handle temporary copies
FUNCTION Create TemporaryCopy(table, unit, cloud-
    Address, duration, requestingEntity) {
    IF NOT HasPrivilege(unit, "write", requestingEntity)
        THEN
        RETURN ERROR("Insufficient privileges")
    AddCopy(table, unit, cloudAddress, requestingEntity)
    SET_TIMER(duration, DeleteTemporaryCopy(table,
        unit.id, cloudAddress))
}
FUNCTION DeleteTemporaryCopy(table, unitId, cloud-
    Address) {
    FOR EACH entry IN table.entries {
        IF entry.dataUnit.id=unitId AND
            entry.location.cloudAddress=cloudAddress
            THEN
            DeleteDataAtLocation(entry.dataUnit.content,
                cloudAddress)
            table.entries.Remove(entry)
            entry.dataUnit.locations.Remove(entry.location)
            RETURN SUCCESS
    }
}
//Microservices integration
FUNCTION MicroserviceHandler(request) {
    IF request.type="create" THEN
        DataUnit unit=CreateDataUnit(request.content)
        AddCopy(mainTable, unit, request.cloudAddress,
            request.entity)
    ELSE IF request.type="access" THEN
        RETURN AccessCopy(mainTable, request.unitId,
            request.cloudAddress, request.entity)
    ELSE IF request.type="move" THEN
        MoveCopy(mainTable, request.unitId, request.ol-
            dAddress, request.newAddress, request.entity)
    ELSE IF request.type="audit" THEN
        RETURN AuditLocations(mainTable, request.u-
            nitId)
    ELSE IF request.type="temp" THEN
        CreateTemporaryCopy(mainTable, request.unit,
            request.cloudAddress, request.duration, request-
            .entity)
}
```

The pseudocode outlines a sample system for managing data replication in a cloud environment using a microservices-based, object-oriented approach, and the explanation begins with the data structures that form its foundation. The DataUnit structure represents the core entity, encapsulating a unique identifier, the content (which could be tables, rows, columns, or combinations), a list of locations where copies reside, and a list of privileges defining access rights. The Location structure tracks each copy's cloud address, creation timestamp, and access count, providing essential metadata for managing replication. The Privilege structure specifies access types like read, write, or consume, tied to an entity identifier, ensuring security enforcement. The FootprintTable structure serves as the central ledger, holding a list of entries up to a maximum size, with a chosen deletion algorithm to govern copy removal. The Entry structure links a DataUnit to its Location, forming the table's records.

Initialization of the system occurs through a function that sets up the FootprintTable with a specified maximum number of copies and a deletion algorithm, preparing it to track data replication. Creating a DataUnit involves generating a unique identifier and encapsulating the provided content, initializing empty lists for locations and privileges to be populated later. Adding privileges to a DataUnit entails appending a new Privilege structure with the specified type and entity identifier, building the access control framework. Checking for privileges involves iterating through the DataUnit's privilege list to confirm if a requesting entity has the required permission, returning a boolean result to enforce security.

Adding a copy of a DataUnit to a cloud location requires verifying write privileges for the requesting entity, and if granted, a new Location is created with the current timestamp and zero access count. If the FootprintTable is at capacity, the system triggers a removal process before appending the new entry, which includes the DataUnit and its Location, and updates the DataUnit's location list while storing the content at the specified address. The removal process selects an entry to delete based on the chosen algorithm, such as Last In First Out, which removes the most recent entry, or First In First Out, which targets the oldest. Least Recently Used identifies the entry with the earliest creation timestamp, Most Recently Used selects the latest, and Least Frequently Used finds the least accessed, each followed by deleting the content from its location and updating the table and DataUnit records.

Accessing a copy involves searching the FootprintTable for a matching DataUnit identifier and cloud address, checking read privileges, incrementing the access count, and retrieving the data if authorized, or returning an error if not found or permitted. Moving a copy to a new location requires write privileges, retrieves the data from the old address, stores it at the new one, deletes it from the original, and updates the entry's location details and the DataUnit's location list. Auditing locations compiles a list of all recorded locations for a given DataUnit identifier by scanning the table, providing a snapshot for review or compliance purposes.

Handling temporary copies extends the add copy functionality by setting a timer to delete the copy after a specified duration, ensuring transient data does not persist beyond its purpose. The deletion of a temporary copy searches for the matching entry, removes the data from its location, and updates the table and DataUnit records, maintaining the replication limit. Helper functions for deletion algorithms iterate through the entries to find the appropriate one based on timestamps or access counts, ensuring accurate implementation of each strategy.

The microservices integration ties the system together, defining a handler function that processes various request types, such as creating a new DataUnit and adding a copy, accessing an existing copy, moving a copy, auditing locations, or creating a temporary copy. This handler acts as the interface between applications and the data management system, routing requests to the appropriate functions while leveraging the main FootprintTable. Each operation maintains the system's core principles of limited replication, privilege enforcement, and location tracking, ensuring consistency across distributed environments.

The pseudocode captures the invention's unique aspects, such as the object-oriented encapsulation of data units with embedded privileges and locations, the configurable deletion algorithms, and the microservices-driven modularity. It supports scalability by allowing the FootprintTable to operate across multiple cloud vendors and applications, with real-time updates to locations and privileges. The system's ability to handle metadata implicitly through the DataUnit content and enforce uniform replication rules across diverse platforms further distinguishes its design, providing a robust framework for secure and efficient data management in cloud settings.

The systems and methods described in the disclosure allow for numerous alternatives, modifications, combinations, and customizations that align with its spirit and scope, focusing on managing data replication in cloud environments through a microservices-based, object-oriented framework. One alternative involves adjusting the structure of the DataUnit to include additional attributes, such as a priority level for each data unit, enabling the system to favor certain copies over others during deletion processes based on their significance to specific applications. Another modification could replace the fixed-size FootprintTable with a dynamic sizing mechanism that adjusts the maximum number of copies based on real-time system load or storage availability, providing flexibility in resource-constrained environments. Combining these, the system might integrate priority levels with dynamic sizing, ensuring high-priority data units receive more copies when capacity permits, while low-priority units face stricter limits.

The deletion algorithms present further opportunities for customization. Instead of relying solely on predefined options like Last In First Out or Least Recently Used, the system could incorporate a hybrid approach that weighs multiple factors, such as access frequency and creation time, to determine which copy to remove. An alternative might involve a machine learning component that predicts usage patterns and selects the optimal deletion strategy for each data unit, adapting to evolving application needs. This could combine with a modification where the system allows manual overrides, letting administrators specify deletion preferences for certain data units, enhancing control in sensitive scenarios.

The privilege management system offers room for expansion. One customization could extend the Privilege structure to include time-based access rights, where permissions expire after a set period, adding a layer of temporal security. An alternative might integrate role-based access control, grouping entities into categories with predefined privilege sets, simplifying administration in large-scale deployments. Combining these, the system could enforce both time-based and role-based privileges, ensuring that only authorized entities access data within specific windows, tailored to organizational policies.

The microservices architecture itself supports various modifications. One alternative could deploy the microservices across a federated cloud model, where each service operates on a different vendor's infrastructure, enhancing resilience and vendor interoperability. Another customization might introduce redundant microservices for each function, ensuring high availability by duplicating critical operations across multiple instances. A combination of these could pair federated deployment with redundancy, distributing services across vendors while maintaining backups, optimizing both performance and reliability.

Data storage interactions provide additional avenues for variation. The system could modify the StoreDataAtLocation function to encrypt data before storage, adding a security layer without altering the replication logic. An alternative might integrate with existing cloud caching systems, treating cache entries as temporary copies managed by the FootprintTable, aligning external tools with the invention's principles. Combining these, the system could encrypt data and manage cache integration, ensuring secure, controlled replication across both persistent and transient stores.

The handling of temporary copies allows for further customization. One modification could adjust the CreateTemporaryCopy function to support variable durations based on data type or application request, rather than a fixed timer. An alternative might tag temporary copies with metadata specifying their purpose, enabling audits to distinguish them from permanent copies. A combination could implement variable durations with purpose tagging, providing granular control and visibility over transient data usage.

The audit functionality offers modification potential. One alternative could expand AuditLocations to include access history, logging each interaction with a copy for detailed tracking. Another customization might generate periodic audit reports automatically, notifying administrators of replication status without manual queries. Combining these, the system could log access history and produce scheduled reports, enhancing oversight in compliance-driven environments.

Integration with applications presents opportunities for customization. The MicroserviceHandler could modify its request processing to prioritize certain applications, queuing requests from high-demand sources ahead of others. An alternative might add a feedback loop, where applications report usage metrics to refine deletion algorithms. Combining these, the system could prioritize requests and use feedback to optimize copy management, aligning replication with operational demands.

The object-oriented design supports alternative implementations. One modification could encapsulate additional methods within the DataUnit, such as self-monitoring functions that alert the system to anomalies in access patterns. Another customization might redefine data units as hierarchical objects, where parent units contain child units with inherited privileges, managing complex datasets. A combination could integrate self-monitoring with hierarchical structures, enabling proactive security and efficient handling of nested data.

The system's scalability allows for modifications in deployment. One alternative could shard the FootprintTable across multiple servers, distributing entries based on data unit identifiers to handle larger datasets. Another customization might implement a load balancer to route requests to the least-burdened microservice instance, improving response times. Combining these, the system could shard the table and balance loads, ensuring performance as the cloud environment grows.

While the present technology has been explained through what are currently regarded as the most practical and preferred embodiments, it should be recognized that these specifics are provided solely for illustrative purposes, and the disclosure is not confined to the particular descriptions and embodiments outlined. Instead, it is intended to encompass modifications and comparable arrangements that fall within the spirit and scope of the appended claims. For instance, it is understood that the present technology envisions the possibility of integrating, where feasible, one or more elements from any given embodiment with one or more elements from any other embodiment. This flexibility ensures that the invention adapts to diverse technical contexts, such as varying cloud vendor protocols or application requirements, while preserving its core focus on limiting data replication and enhancing security through a microservices-based, object-oriented approach.

The invention claimed is:

1. A method for managing data replication in a cloud computing environment, comprising:

encapsulating, by a processor executing a microservices-based architecture, content into a data unit, the data unit including a list of locations and a list of access privileges;

storing, by the processor, the data unit in a memory accessible across a plurality of cloud vendors;

maintaining, within a footprint table managed by the processor, a plurality of entries, each entry representing a copy of the data unit and a corresponding location in the cloud computing environment;

tracking, using the footprint table, the corresponding location and an access count for each copy of the data unit;

receiving, at the microservices-based architecture executed by the processor, a request from an entity to create a new copy of the data unit at a new location in the cloud computing environment;

verifying, by the processor, that the entity has a write privilege in the list of access privileges of the data unit;

determining, by the processor, whether a number of the plurality of entries in the footprint table equals a predefined maximum number;

removing, by the processor, an existing entry from the plurality of entries in the footprint table when the number of the plurality of entries equals the predefined maximum number, the removing performed by applying a deletion algorithm selected from the group consisting of Last In First Out (LIFO), First In First Out (FIFO), and Least Recently Used (LRU);

storing, by the processor, the new copy of the data unit at the new location in the cloud computing environment;

adding, by the processor, a new entry to the plurality of entries in the footprint table, the new entry representing the new copy of the data unit at the new location; and updating, by the processor, the list of locations in the data unit to include the new location, thereby limiting a data footprint of the data unit and reducing data vulnerability across the plurality of cloud vendors.

2. The method of claim 1, wherein defining, by the processor, the content of the data unit as comprising one or more elements selected from the group consisting of a table, a row of a table, a column of a table, and a single entry in a table.

3. The method of claim 2, further comprising assigning, by the processor, a unique identifier to the data unit, the unique identifier distinguishing the data unit from other data units in the cloud computing environment.

4. The method of claim 3, further comprising recording, by the processor, a creation timestamp in each entry of the plurality of entries in the footprint table, the creation timestamp indicating when the copy of the data unit was stored at the corresponding location.

5. The method of claim 4, wherein selecting, by the processor, the deletion algorithm as Least Recently Used (LRU) based on the creation timestamp and the access count of each copy of the data unit.

6. The method of claim 5, further comprising auditing, by the processor, the list of locations in the data unit to generate a log of all corresponding locations of the copies of the data unit across the plurality of cloud vendors.

7. The method of claim 6, further comprising:

receiving, at the microservices-based architecture executed by the processor, a request from a second entity to access an existing copy of the data unit at an existing location in the cloud computing environment;

verifying, by the processor, that the second entity has a read privilege in the list of access privileges of the data unit;

retrieving, by the processor, the existing copy of the data unit from the existing location; and incrementing, by the processor, the access count for the existing copy in the corresponding entry in the footprint table.

8. The method of claim 7, further comprising:

moving, by the processor, the existing copy of the data unit from the existing location to a different location in the cloud computing environment; and updating, by the processor, the corresponding entry in the footprint table and the list of locations in the data unit to reflect the different location.

9. The method of claim 8, further comprising:

creating, by the processor, a temporary copy of the data unit at a temporary location in the cloud computing environment for a predefined duration;

adding, by the processor, a temporary entry to the plurality of entries in the footprint table for the temporary copy; and deleting, by the processor, the temporary copy and the temporary entry from the footprint table after the predefined duration expires.

10. The method of claim 9, wherein encrypting, by the processor, the content of the data unit before storing the new copy and the temporary copy in the cloud computing environment.

11. A method for managing data replication in a cloud computing environment, comprising:

encapsulating, by a processor executing a microservices-based architecture, content into a data unit, the data unit including a list of locations and a list of access privileges;

defining, by the processor, the content of the data unit as comprising one or more elements selected from the group consisting of a table, a row of a table, a column of a table, and a single entry in a table;

assigning, by the processor, a unique identifier to the data unit, the unique identifier distinguishing the data unit from other data units in the cloud computing environment;

storing, by the processor, the data unit in a memory accessible across a plurality of cloud vendors;

maintaining, within a footprint table managed by the processor, a plurality of entries, each entry representing a copy of the data unit and a corresponding location in the cloud computing environment;

tracking, using the footprint table, the corresponding location and an access count for each copy of the data unit;

recording, by the processor, a creation timestamp in each entry of the plurality of entries in the footprint table, the creation timestamp indicating when the copy of the data unit was stored at the corresponding location;

receiving, at the microservices-based architecture executed by the processor, a request from an entity to create a new copy of the data unit at a new location in the cloud computing environment;

verifying, by the processor, that the entity has a write privilege in the list of access privileges of the data unit;

determining, by the processor, whether a number of the plurality of entries in the footprint table equals a predefined maximum number;

removing, by the processor, an existing entry from the plurality of entries in the footprint table when the number of the plurality of entries equals the predefined maximum number, the removing performed by applying a deletion algorithm;

selecting, by the processor, the deletion algorithm as Least Recently Used (LRU) based on the creation timestamp and the access count of each copy of the data unit;

encrypting, by the processor, the content of the data unit before storing the new copy;

storing, by the processor, the new copy of the data unit at the new location in the cloud computing environment, thereby limiting a data footprint of the data unit and reducing data vulnerability across the plurality of cloud vendors;

adding, by the processor, a new entry to the plurality of entries in the footprint table, the new entry representing the new copy of the data unit at the new location;

updating, by the processor, the list of locations in the data unit to include the new location;

auditing, by the processor, the list of locations in the data unit to generate a log of all corresponding locations of the copies of the data unit across the plurality of cloud vendors;

receiving, at the microservices-based architecture executed by the processor, a request from a second entity to access an existing copy of the data unit at an existing location in the cloud computing environment;

verifying, by the processor, that the second entity has a read privilege in the list of access privileges of the data unit;

retrieving, by the processor, the existing copy of the data unit from the existing location;

incrementing, by the processor, the access count for the existing copy in the corresponding entry in the footprint table;

moving, by the processor, the existing copy of the data unit from the existing location to a different location in the cloud computing environment;

updating, by the processor, the corresponding entry in the footprint table and the list of locations in the data unit to reflect the different location;

creating, by the processor, a temporary copy of the data unit at a temporary location in the cloud computing environment for a predefined duration;

adding, by the processor, a temporary entry to the plurality of entries in the footprint table for the temporary copy;

encrypting, by the processor, the content of the data unit before storing the temporary copy;

storing, by the processor, the temporary copy at the temporary location in the cloud computing environment;

deleting, by the processor, the temporary copy and the temporary entry from the footprint table after the predefined duration expires;

interfacing, by the microservices-based architecture, with a data virtualization tool to regulate creation of additional copies of the data unit by the data virtualization tool, ensuring the additional copies comply with the predefined maximum number;

generating, by the processor, a periodic report from the log, the periodic report detailing the corresponding locations and access counts of all copies of the data unit;

adjusting, by the processor, the predefined maximum number based on a system load of the cloud computing environment; and tagging, by the processor, the temporary copy with metadata indicating a purpose of the temporary copy, the metadata distinguishable in the log from metadata of the new copy.

12. A system for managing data replication in a cloud computing environment, comprising:

a memory configured to store a data unit, the data unit including content, a list of locations, and a list of access privileges;

a footprint table configured to maintain a plurality of entries, each entry representing a copy of the data unit and a corresponding location in the cloud computing environment, the footprint table configured to be used by the processor to track the corresponding location and an access count for each copy; and a processor communicatively coupled to the memory and the footprint table, the processor configured to execute a microservices-based architecture to:

encapsulate the content into the data unit;

store the data unit in the memory, the memory accessible across a plurality of cloud vendors;

receive, via the microservices-based architecture, a request from an entity to create a new copy of the data unit at a new location in the cloud computing environment;

verify that the entity has a write privilege in the list of access privileges;

determine whether a number of the plurality of entries in the footprint table equals a predefined maximum number;

remove an existing entry from the plurality of entries in the footprint table when the number of the plurality of entries equals the predefined maximum number, the removal performed by applying a deletion algorithm selected from the group consisting of Last In First Out (LIFO), First In First Out (FIFO), and Least Recently Used (LRU);

store the new copy at the new location in the cloud computing environment, thereby limiting a data footprint of the data unit and reducing data vulnerability across the plurality of cloud vendors;

add a new entry to the plurality of entries in the footprint table, the new entry representing the new copy at the new location; and update the list of locations in the data unit to include the new location.

13. The system of claim 12, wherein the processor is further configured to define the content of the data unit as comprising one or more elements selected from the group consisting of a table, a row of a table, a column of a table, and a single entry in a table.

14. The system of claim 13, wherein the processor is further configured to assign a unique identifier to the data unit, the unique identifier distinguishing the data unit from other data units in the cloud computing environment.

15. The system of claim 14, wherein the processor is further configured to record a creation timestamp in each entry of the plurality of entries in the footprint table, the creation timestamp indicating when the copy of the data unit was stored at the corresponding location.

16. The system of claim 15, wherein the processor is further configured to select the deletion algorithm as Least Recently Used (LRU) based on the creation timestamp and the access count of each copy of the data unit.

17. The system of claim 16, wherein the processor is further configured to audit the list of locations in the data unit to generate a log of all corresponding locations of the copies of the data unit across the plurality of cloud vendors.

18. The system of claim 17, wherein the processor is further configured to:

receive, via the microservices-based architecture, a request from a second entity to access an existing copy of the data unit at an existing location in the cloud computing environment;

verify that the second entity has a read privilege in the list of access privileges;

retrieve the existing copy from the existing location; and increment the access count for the existing copy in the corresponding entry in the footprint table.

19. The system of claim 18, wherein the processor is further configured to:

move the existing copy of the data unit from the existing location to a different location in the cloud computing environment; and update the corresponding entry in the footprint table and the list of locations in the data unit to reflect the different location.

20. The system of claim 19, wherein the processor is further configured to:

create a temporary copy of the data unit at a temporary location in the cloud computing environment for a predefined duration;

add a temporary entry to the plurality of entries in the footprint table for the temporary copy;

encrypt the content of the data unit before storing the temporary copy and the new copy at their respective locations;

store the temporary copy at the temporary location;

delete the temporary copy and the temporary entry from the footprint table after the predefined duration expires;

interface, via the microservices-based architecture, with a data virtualization tool to regulate creation of additional copies of the data unit by the data virtualization tool, ensuring the additional copies comply with the predefined maximum number;

generate a periodic report from the log, the periodic report detailing the corresponding locations, access counts, and creation timestamps of all copies of the data unit;

adjust the predefined maximum number dynamically based on a system load of the cloud computing environment;

tag the temporary copy with metadata indicating a purpose of the temporary copy, the metadata distinguishable in the log from metadata of the new copy and the existing copy; and prioritize retention of a specific copy of the data unit at a prioritized location based on a performance metric of the prioritized location, the performance metric including a latency value for data access by an application in the cloud computing environment.

* * * * *